United States Patent
Tepe et al.

(10) Patent No.: US 12,139,266 B2
(45) Date of Patent: Nov. 12, 2024

(54) INVERTER CIRCUITS AND ELECTRICAL PROPULSION SYSTEMS FOR EVTOL AIRCRAFT

(71) Applicant: Archer Aviation, Inc., San Jose, CA (US)

(72) Inventors: Alan Tepe, San Jose, CA (US); Stephen Spiteri, San Jose, CA (US); Wei Wu, San Jose, CA (US); Diederik Marius, San Jose, CA (US)

(*) Notice: Subject to any disclaimer, the term of this patent is extended or adjusted under 35 U.S.C. 154(b) by 0 days.

(21) Appl. No.: 18/663,960

(22) Filed: May 14, 2024

(65) Prior Publication Data

US 2024/0300659 A1    Sep. 12, 2024

Related U.S. Application Data

(63) Continuation of application No. 18/363,535, filed on Aug. 1, 2023.

(Continued)

(51) Int. Cl.
*B64D 27/24*    (2024.01)
*B60L 15/06*    (2006.01)
(Continued)

(52) U.S. Cl.
CPC ............... *B64D 27/24* (2013.01); *B60L 15/06* (2013.01); *B60L 15/38* (2013.01); *B64C 27/54* (2013.01);
(Continued)

(58) Field of Classification Search
CPC .......... H02M 3/07; H02M 3/156; H02M 3/16; H02M 3/22; H02M 5/40; H02M 7/00;
(Continued)

(56) References Cited

U.S. PATENT DOCUMENTS 8,269,434 B2    9/2012    Welchko et al.
9,985,566 B2    5/2018    Jiang
(Continued)

FOREIGN PATENT DOCUMENTS

EP    3820030 A1    5/2021

OTHER PUBLICATIONS

International Search Report and Written Opinion for PCT application No. PCT/US2023/076196, dated Mar. 21, 2024, 17 pages.

*Primary Examiner* — Antony M Paul
(74) *Attorney, Agent, or Firm* — Finnegan, Henderson Farabow, Garrett & Dunner LLP

(57) ABSTRACT

An electrical propulsion system includes an electrical motor configured to drive one or more propellers of the aircraft, a capacitor configured to stabilize a direct current (DC) bus voltage, a first inverter circuit coupled to the capacitor and configured to convert the DC bus voltage to alternate current (AC) voltages to drive a first set of stator windings of the electrical motor, in response to a first pulse width modulation (PWM) vector, and a second inverter circuit coupled to the capacitor and configured to convert the DC bus voltage to AC voltages to drive a second set of stator windings of the electrical motor, in response to a second PWM vector. The first PWM vector and the second PWM vector are substantially equal and opposite vectors.

23 Claims, 18 Drawing Sheets

Related U.S. Application Data

(60) Provisional application No. 63/378,680, filed on Oct. 7, 2022, provisional application No. 63/378,536, filed on Oct. 6, 2022.

(51) Int. Cl.
| | |
|---|---|
| *B60L 15/38* | (2006.01) |
| *B64C 27/54* | (2006.01) |
| *B64C 29/00* | (2006.01) |
| *B64D 33/08* | (2006.01) |
| *B64D 35/02* | (2024.01) |
| *F16B 2/06* | (2006.01) |
| *F16H 57/08* | (2006.01) |
| *H02K 1/27* | (2022.01) |
| *H02K 1/32* | (2006.01) |
| *H02K 5/124* | (2006.01) |
| *H02K 5/20* | (2006.01) |
| *H02K 7/08* | (2006.01) |
| *H02K 7/116* | (2006.01) |
| *H02K 9/19* | (2006.01) |
| *H02K 11/33* | (2016.01) |
| *H02K 15/03* | (2006.01) |
| *H02M 7/5395* | (2006.01) |
| *H02P 21/00* | (2016.01) |
| *H02P 25/16* | (2006.01) |
| *H02P 27/06* | (2006.01) |
| *H02P 27/08* | (2006.01) |
| *H02K 7/00* | (2006.01) |

(52) U.S. Cl.
CPC ...... *B64C 29/0008* (2013.01); *B64C 29/0033* (2013.01); *B64D 33/08* (2013.01); *B64D 35/02* (2013.01); *F16B 2/06* (2013.01); *F16H 57/08* (2013.01); *H02K 1/27* (2013.01); *H02K 1/32* (2013.01); *H02K 5/124* (2013.01); *H02K 5/203* (2021.01); *H02K 7/08* (2013.01); *H02K 7/116* (2013.01); *H02K 9/19* (2013.01); *H02K 11/33* (2016.01); *H02K 15/03* (2013.01); *H02M 7/5395* (2013.01); *H02P 21/50* (2016.02); *H02P 25/16* (2013.01); *H02P 27/06* (2013.01); *H02P 27/08* (2013.01); *B60L 2200/10* (2013.01); *B60L 2210/40* (2013.01); *H02K 7/006* (2013.01)

(58) Field of Classification Search
CPC ...... H02M 7/219; H02M 7/5387; H02M 1/32; H02M 7/5395; H02M 5/458; H02P 27/04; H02P 27/06; H02P 27/08; H02P 21/50; H02P 29/024; H02P 29/0241; H02P 29/027; H02K 7/08; H02K 7/116; H02K 11/33; B64D 27/24; B60L 2200/10; B60L 3/003; B60L 2220/14; B60L 2210/40
See application file for complete search history.

(56) References Cited

U.S. PATENT DOCUMENTS

| | | |
|---|---|---|
| 2009/0033251 A1 | 2/2009 | Perisic et al. |
| 2019/0149063 A1* | 5/2019 | Onda ................ B60L 3/12 361/30 |
| 2020/0395878 A1 | 12/2020 | Takahashi |
| 2022/0077807 A1 | 3/2022 | Jeong et al. |
| 2022/0094297 A1 | 3/2022 | Lacaux et al. |
| 2022/0185490 A1 | 6/2022 | Ricci et al. |
| 2023/0179137 A1 | 6/2023 | Faedo et al. |

* cited by examiner

1400

```
┌─────────────────────────────────────────────────────────────┐
│ Detect whether a fault occurs on one of a plurality of      │
│ switches in the inverter circuit                            │
│                                                             │
│                          1410                               │
└─────────────────────────────────────────────────────────────┘
                              │
                              ▼
┌─────────────────────────────────────────────────────────────┐
│ Apply a three-phase short by controlling low-side switches  │
│ or high-side switches, in response to the detection of the  │
│ single-phase short-circuit fault                            │
│                                                             │
│                          1420                               │
└─────────────────────────────────────────────────────────────┘
                              │
                              ▼
┌─────────────────────────────────────────────────────────────┐
│ Disconnect the inverter circuit from a power source         │
│                                                             │
│                          1430                               │
└─────────────────────────────────────────────────────────────┘
                              │
                              ▼
┌─────────────────────────────────────────────────────────────┐
│ Discharge a bus voltage across a bus capacitor of the       │
│ inverter circuit after the inverter circuit is disconnected │
│ from the power source                                       │
│                                                             │
│                          1440                               │
└─────────────────────────────────────────────────────────────┘
                              │
                              ▼
┌─────────────────────────────────────────────────────────────┐
│ Close the plurality of switches in the inverter circuit to  │
│ short the bus capacitor, in response to the bus voltage     │
│ being lower than a first threshold value                    │
│                                                             │
│                          1450                               │
└─────────────────────────────────────────────────────────────┘
```

*FIG. 14*

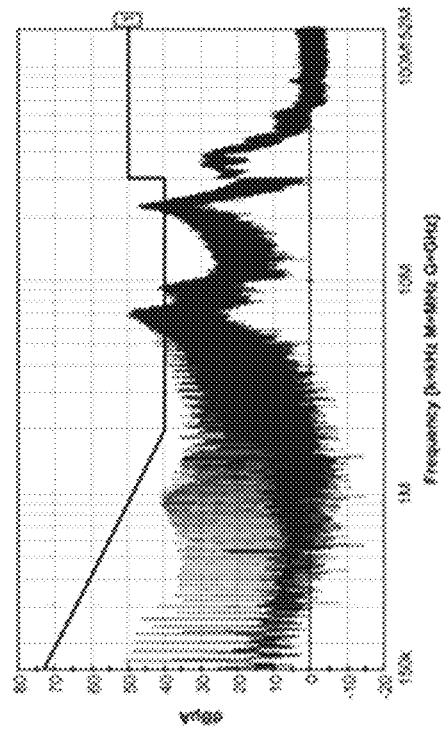
FIG. 16A
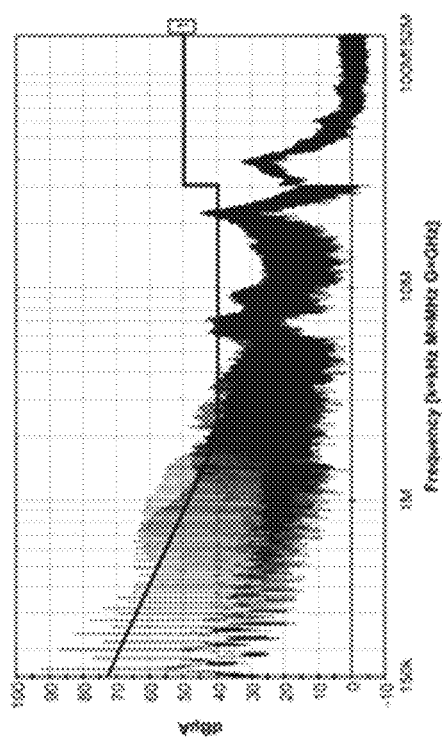
FIG. 16B
FIG. 16C
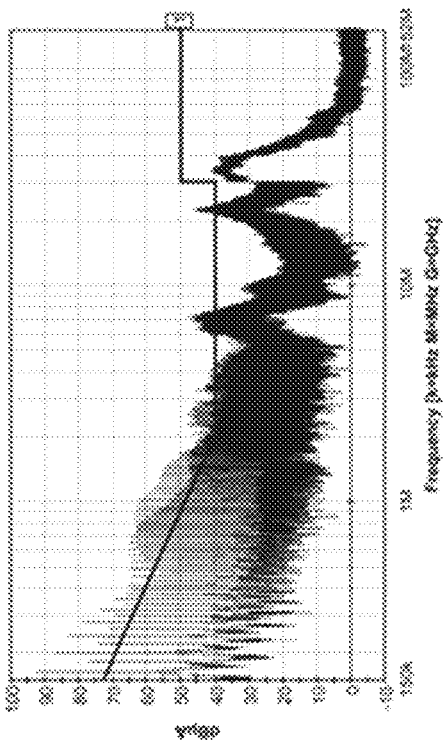
FIG. 16D

INVERTER CIRCUITS AND ELECTRICAL PROPULSION SYSTEMS FOR EVTOL AIRCRAFT

CROSS-REFERENCE TO RELATED APPLICATIONS

This disclosure is a continuation of U.S. patent application Ser. No. 18/363,535, filed on Aug. 1, 2023, which claims priority to U.S. Provisional Application No. 63/378,536, titled "Tilt Rotor Systems and Methods for eVTOL Aircraft," filed Oct. 6, 2022, and U.S. Provisional Application No. 63/378,680, titled "Systems and Methods for Improved Propulsion Systems for eVTOL Aircraft," filed Oct. 7, 2022, the contents of which are incorporated herein in their entirety.

TECHNICAL FIELD

This disclosure relates generally to the field of powered aerial vehicles. More particularly, and without limitation, the present disclosure relates to innovations in tilt-rotor aircraft that use electrical propulsion systems. Certain aspects of the present disclosure generally relate to improvements in the electrical propulsion system of the tilt-rotor aircraft. Other aspects of the present disclosure generally relate to improvements in power inverters that may be used in other types of vehicles but provide particular advantages in aerial vehicles.

SUMMARY

Embodiments of the present disclosure provide a propulsion system for an aircraft. The electrical propulsion system may include an electrical motor configured to drive one or more propellers of the aircraft, a capacitor configured to stabilize a direct current (DC) bus voltage, a first inverter circuit coupled to the capacitor and configured to convert the DC bus voltage on a first bus of the first inverter circuit to alternate current (AC) voltages to drive a first set of stator windings of the electrical motor, based on a first pulse width modulation (PWM) vector, and a second inverter circuit coupled to the capacitor and configured to convert the DC bus voltage on a second bus of the second inverter circuit to AC voltages to drive a second set of stator windings of the electrical motor, based on a second PWM vector. The first PWM vector and the second PWM vector are substantially equal and opposite vectors.

Embodiments of the present disclosure provide a method for controlling a propulsion system for an aircraft. The method may include: stabilizing, by a capacitor, a direct current (DC) bus voltage; converting, by a first inverter circuit coupled to the capacitor, the DC bus voltage to alternate current (AC) voltages to drive a first set of stator windings of an electrical motor according to a first pulse width modulation (PWM) vector; and converting, by a second inverter circuit coupled to the capacitor, the DC bus voltage to AC voltages to drive a second set of stator windings of the electrical motor, in response to a second PWM vector, wherein the first PWM vector and the second PWM vector are substantially equal and opposite vectors; and driving one or more propellers of the aircraft by the electrical motor. Other embodiments may include corresponding integrated circuits, computer systems, apparatus, and computer programs recorded on one or more computer storage devices, each configured to perform the actions of the methods.

Embodiments of the present disclosure provide an inverter circuit. The inverter circuit may include a capacitor configured to stabilize a direct current (DC) bus voltage, a plurality of switches forming a plurality of phase legs, where any of the phase legs may include an upper switch arranged between a positive terminal of the capacitor and an AC output terminal of the phase leg and a lower switch arranged between a negative terminal of the capacitor and the AC output terminal of the phase leg, and a first discharging circuit coupled to the capacitor in parallel and configured to provide a first discharging path for discharging energy stored in the capacitor. The plurality of switches are controlled to short the capacitor in response to the DC bus voltage being lower than a threshold value in a fault condition.

Embodiments of the present disclosure provide a method for controlling an inverter circuit. The method may include detecting whether a fault occurs on one of a plurality of switches in the inverter circuit, disconnecting the inverter circuit from a power source, in response to a detection of a single-phase short-circuit fault, providing, by a first discharging circuit, a first discharging path to discharge a DC bus voltage across a capacitor of the inverter circuit after the inverter circuit is disconnected from the power source, and controlling the plurality of switches in the inverter circuit to short the capacitor, in response to the bus voltage being lower than a first threshold value. Other embodiments may include corresponding integrated circuits, computer systems, apparatus, and computer programs recorded on one or more computer storage devices, each configured to perform the actions of the methods.

Embodiments of the present disclosure provide an inverter circuit. The inverter circuit may include: a capacitor configured to stabilize a direct current (DC) bus voltage; a plurality of switches forming a plurality of phase legs, wherein any of the phase legs comprises an upper switch arranged between a positive terminal of the capacitor and an AC output terminal of the phase leg and a lower switch arranged between a negative terminal of the capacitor and the AC output terminal of the phase leg; a first discharging circuit coupled to the capacitor in parallel and configured to provide a first discharging path for discharging energy stored in the capacitor; and a second discharging circuit coupled to the capacitor in parallel and configured to provide a second discharging path for discharging energy stored in the capacitor, in response to the DC bus voltage being lower than a threshold value in a fault condition.

Embodiments of the present disclosure provide a method for controlling an inverter circuit. The method may include: detecting whether a fault occurs on one of a plurality of switches in the inverter circuit; disconnecting the inverter circuit from a power source, in response to a detection of a single-phase short-circuit fault; and discharging a bus voltage across a capacitor of the inverter circuit after the inverter circuit is disconnected from the power source by: using a first discharging circuit to provide a first discharging path, in response to a confirmation that the inverter circuit is disconnected from the power source; and using a second discharging circuit to provide a second discharging path in parallel to the first discharging path, in response to the bus voltage being lower than a threshold value. Other embodiments may include corresponding integrated circuits, computer systems, apparatus, and computer programs recorded on one or more computer storage devices, each configured to perform the actions of the methods.

BRIEF DESCRIPTIONS OF DRAWINGS

FIG. 14 is a diagram illustrating an example flowchart of a method for controlling the inverter circuit of FIG. 13A or FIG. 13B, consistent with some embodiments of the present disclosure.

FIG. 16A-16D are graphs showing EMI noises in a dual inverter system or in a single inverter system, consistent with some embodiments of the present disclosure.

DETAILED DESCRIPTION

Figure 1:
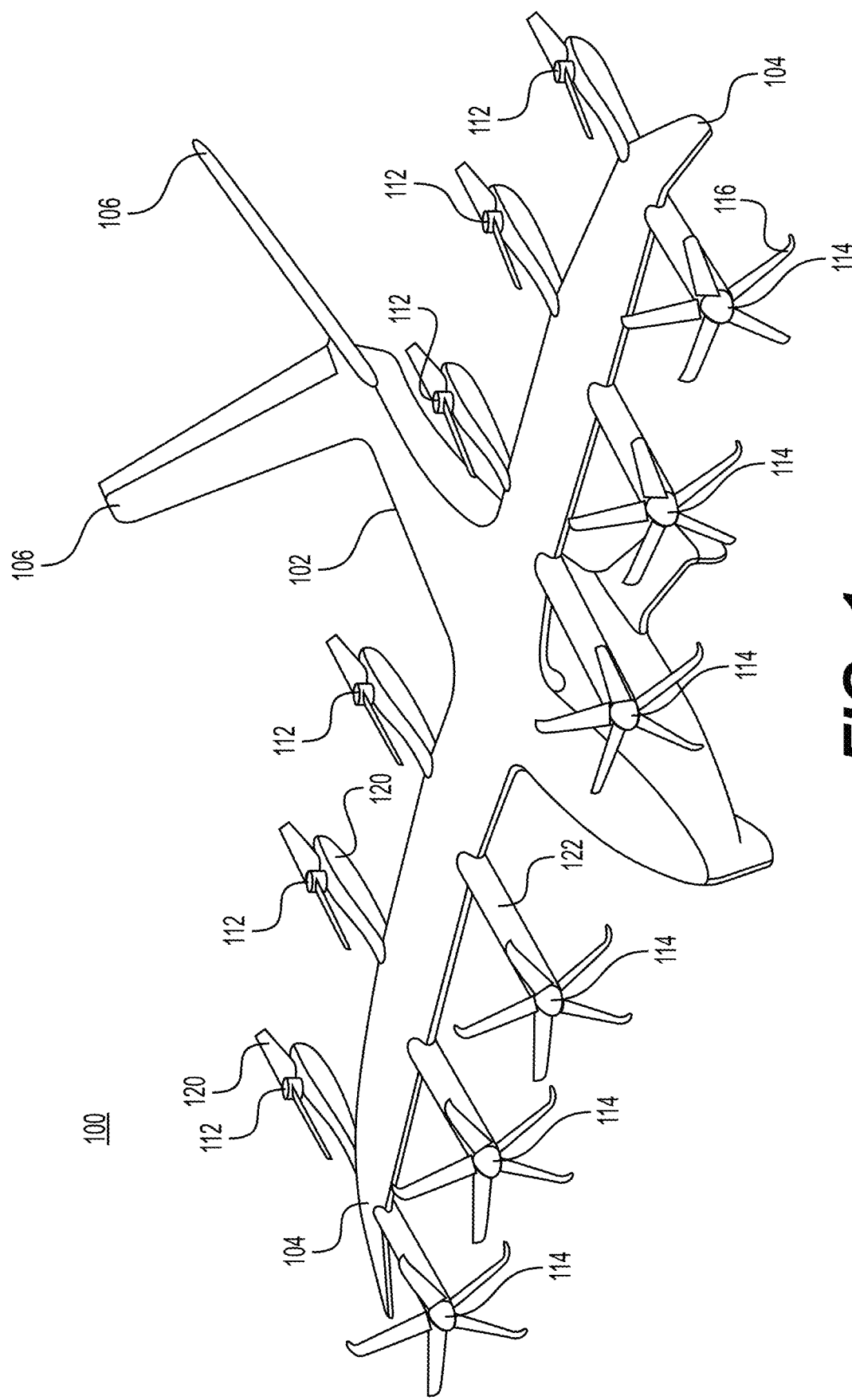
FIG. 1 is an illustration of a perspective view of an exemplary VTOL aircraft, consistent with some embodiments of the present disclosure.

The following disclosure provides different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In this document, the term "coupled" may also be termed as "electrically coupled", and the term "connected" may be termed as "electrically connected." "Coupled" and "connected" may also be used to indicate that two or more elements cooperate or interact with each other.

The present disclosure addresses components of electric vertical takeoff and landing (eVTOL) aircraft primarily for use in a non-conventional aircraft. For example, the eVTOL aircraft of the present disclosure may be intended for frequent (e.g., over 50 flights per workday), short-duration flights (e.g., less than 100 miles per flight) over, into, and out of densely populated regions. The aircraft may be intended to carry 4-6 passengers or commuters who have an expectation of a low-noise and low-vibration experience. Accordingly, it may be desired that their components are configured and designed to withstand frequent use without wearing, that they generate less heat and vibration, and that the aircraft include mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms. For example, it may be desired for safety reasons that the aircraft are propelled by a distributed propulsion system, avoiding the risk of a single point of failure, and that they are capable of conventional takeoff and landing on a runway. Moreover, it may be desired that the aircraft can safely vertically takeoff and land from and into relatively restricted spaces (e.g., vertiports, parking lots, or driveways) compared to traditional airport runways while transporting around 4-6 passengers or commuters with accompanying baggage. These use requirements may place design constraints on aircraft size, weight, operating efficiency (e.g., drag, energy use), which may impact the design and configuration of the aircraft components.

Disclosed embodiments provide new and improved configurations of aircraft components that are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of eVTOL aircraft components.

In some embodiments, the eVTOL aircraft of the present disclosure may be designed to be capable of both vertical and conventional takeoff and landing, with a distributed electrical propulsion system enabling vertical flight, forward flight, and transition. Thrust may be generated by supplying high voltage electrical power to the electrical engines of the distributed electrical propulsion system, which each may convert the high voltage electrical power into mechanical shaft power to rotate a propeller. Embodiments disclosed herein may involve optimizing the energy density of the electrical propulsion system. Embodiments may include an electrical engine connected to an onboard electrical power source, which may include a device capable of storing energy such as a battery or capacitor, or may include one or more systems for harnessing or generating electricity such as a fuel powered generator or solar panel array. Some disclosed embodiments provide for weight reduction and space reduction of components in the aircraft, thereby increasing aircraft efficiency and performance. Given focus on safety in passenger transportation, disclosed embodiments implement new and improved safety protocols and system redundancy in the case of a failure, to minimize any single points of failure in the aircraft propulsion system. Some disclosed embodiments also provide new and improved approaches to satisfying aviation and transportation laws and regulations. For example, the Federal Aviation Administration enforces federal laws and regulations requiring safety components such as fire protective barriers adjacent to engines that use more than a threshold amount of oil or other flammable materials.

In preferred embodiments, the distributed electrical propulsion system may include twelve electrical engines, which may be mounted on booms forward and aft of the main wings of the aircraft. The forward electrical engines may be tiltable mid-flight between a horizontally oriented position (e.g., to generate forward thrust) and a vertically oriented position (e.g., to generate vertical lift). The forward electrical engines may be of a clockwise type or counterclockwise type in terms of direction of propeller rotation. The aft electrical engines may be fixed in a vertically oriented position (e.g., to generate vertical lift). They may also be of a clockwise type or counterclockwise type in terms of direction of propeller rotation. In some embodiments, an aircraft may possess various combinations of forward and aft electrical engines. For example, an aircraft may possess six forward and six aft electrical engines, four forward and four aft electrical engines, or any other combination of forward and aft engines, including embodiments where the number of forward electrical engines and aft electrical engines are not equivalent. In some embodiments, an aircraft may possess four forward and four aft propellers, where at least four of these propellers comprise tiltable propellers.

In preferred embodiments, for a vertical takeoff and landing (VTOL) mission, the forward electrical engines as well as aft electrical engines may provide vertical thrust during takeoff and landing. During flight phases where the aircraft is in forward flight-mode, the forward electrical engines may provide horizontal thrust, while the propellers of the aft electrical engines may be stowed at a fixed position in order to minimize drag. The aft electrical engines may be actively stowed with position monitoring. Transition from vertical flight to horizontal flight and vice-versa may be accomplished via the tilt propeller subsystem. The tilt propeller subsystem may redirect thrust between a primarily vertical direction during vertical flight mode to a mostly horizontal direction during forward-flight mode. A variable pitch mechanism may change the forward electrical engine's propeller-hub assembly blade collective angles for operation during the hover-phase, transition phase, and cruise-phase.

In some embodiments, in a conventional takeoff and landing (CTOL) mission, the forward electrical engines may provide horizontal thrust for wing-borne take-off, cruise, and landing. In some embodiments, the aft electrical engines may not be used for generating thrust during a CTOL mission and the aft propellers may be stowed in place.

In some embodiments, an electric engine may be housed or connected to a boom of an aircraft and include a motor, inverter, and gearbox. In some embodiments, the motor, inverter, and gearbox may be interfaced such that they share a central axis. In some embodiments, the torque originating in the motor may be sent away from the propellers of the propulsion system and to a gearbox. In some embodiments, a gearbox may provide a gear reduction and then send the torque, via a main shaft, back through a bearing located inside the motor and to the propeller. In some embodiments, an inverter may be mounted on the rear of a gearbox such that a main shaft does not travel through the inverter when outputting torque to the propeller. In some embodiments, the motor, gearbox, and inverter may be interfaced such that a coolant, such as oil, may be used to service the motor, inverter, and/or gearbox, while sharing a common heat exchanger. In some embodiments, the amount of oil used to lubricate and cool the electric engine may vary, including amounts less than one quart, two quarts, three quarts, or any other measured amount of oil.

In some embodiments, a tilt propeller system may include a linear or rotary actuator to change the orientation of a propulsion system during operation. In some embodiments, the pitch of the propulsion system may be changed as a function of the orientation of the propulsion system. In some embodiments, a rotary actuator may include a motor, inverter, and gearbox. In some embodiments, a gearbox may include various types of gears interfacing to provide a gear reduction capable of orienting the propulsion system. In some embodiments, a tilt propeller system may include a redundant configuration such that multiple motors, inverters, and gearboxes are present and interface using a gear. In some embodiments, a configuration utilizing multiple motors, gearboxes, and inverters may allow a failed portion of the redundant configuration to be driven by the motor, inverter, and gearbox of another portion of the configuration. In some embodiments, a gearbox configuration may also allow the tilt propeller system to maintain a propulsion system orientation with the help of, or without, additional power being provided by the system.

In some embodiments, an electrical propulsion system as described herein may generate thrust by supplying High Voltage (HV) electric power to an electric engine, which in turn converts HV power into mechanical shaft power which is used to rotate a propeller. As mentioned above, an aircraft as described herein may possess multiple electric engines which are boom-mounted forward and aft of the wing. The amount of thrust each electric engine generates may be governed by a torque command from the Flight Control System (FCS) over a digital communication interface to each electric engine. Embodiments may include forward electric engines, and may be able to alter their orientation, or tilt. Additional embodiments include forward engines that may be a clockwise (CW) type or counterclockwise (CCW) type. The forward electric engine propulsion subsystem may consist of a multi-blade adjustable pitch propeller, as well as a variable pitch subsystem.

In some embodiments, an aircraft may include aft engines, or lifters, that can be of a clockwise (CW) type or counterclockwise (CCW) type. Additional embodiments may include aft electric engines that utilize a multi-blade fixed pitch propeller.

As described herein, the orientation and use of electric propulsion systems may change throughout the operation of the aircraft. In some embodiments, during vertical takeoff and landing, the forward propulsion systems as well as aft propulsion systems may provide vertical thrust during takeoff and landing. During the flight phases where the aircraft is in forward flight-mode, the forward propulsion systems may provide horizontal thrust, while the aft propulsion system propellers may be stowed at a fixed position in order to minimize drag. The aft electric propulsion systems may be actively stowed with position monitoring. Some embodiments may include a transition from vertical flight to horizontal flight and vice-versa. In some embodiments, the transitions may be accomplished via the tilt propeller system (TPS). The TPS redirects thrust between a primarily vertical direction during vertical flight mode to a mostly horizontal direction during forward-flight mode. Additional embodiments may include a variable pitch mechanism that may change the forward propulsion system propeller-hub assembly blade collective angles for operation during the hover-phase, cruise-phase and transition phase. Some embodiments may include a Conventional Takeoff and Landing (CTOL) configurations such that the tilters provide horizontal thrust for wing-borne take-off, cruise and landing. The aft electronic engines are not used for generating thrust during a CTOL mission and the aft propellers are stowed in place.

In some embodiments, an electrical engine as described herein may possess design features which mitigate and protect against uncontained fire, such as utilizing a non-hazardous quantity, of flammable fluid contained in both the tilt and lift engines, not possessing a nominal ignition source within the electric engines, possessing an engine over temperature operating limit that may be more than 50° C. less than a flammable fluid auto-ignition temperature, overtemperature detection and protection, overvoltage detection and protection, and overcurrent detection and protection. In some embodiments, the design features of the electrical engine may deem it to not be a designated fire zone. In some embodiments, the flammable fluid may comprise oil, and the non-hazardous quantity may be less than one quart, or two quarts, or three quarts, or four quarts, or five quarts, or ten quarts, as determined based on factors such as the size, number of propellers, or payload of the aircraft, etc.

As disclosed herein, an electrical engine may include an inverter and motor; or inverter, gearbox, and motor across various configurations, such as representative configurations as described herein. For example, an electrical engine may include an electrical motor, gearbox, and inverter that all share the same central axis. Additionally, the central axis may be configured along an axis of an output shaft going to the propeller of the aircraft. In such an exemplary configuration, the motor, gearbox, and inverter would all share the output shaft as a central axis and would be circularly oriented around the output shaft. Additional embodiments may include a motor, gearbox, and inverter that are mounted together in a sequence, or a configuration where some of the components are mounted together, such as the motor and gearbox, and another component is located elsewhere, such as the inverter, but wiring systems are used to connect the electrical engine.

As mentioned above, an electrical engine for an aircraft as described here may include some or all of a motor, inverter, and gearbox. Various configurations may include an inverter and motor such that the output shaft of a motor directly provides the speed and torque for a propeller shaft. Additional embodiments of an electrical engine may include a motor, inverter, and a gearbox, wherein the output of a motor may travel through a gearbox that is connected to the output shaft for the propeller; a motor, inverter, and gearbox wherein the output from the motor travels away from the propeller, through a gearbox, where the output shaft for the propeller travels back through the gearbox and motor to the propeller. As described herein, an electrical engine may account for any combination or orientation of some or all of a motor, inverter, and gearbox. Additionally, each configuration or orientation of the electrical engine as disclosed herein may include cooling via air-cooling, coolant liquid, or a mixture of both.

For example, a configuration of an electrical engine may include a motor and inverter wherein the motor is in between the propeller of the aircraft and the inverter. Additionally, a motor may include a gearbox. Further, an inverter may share the same central axis as a motor wherein the inverter may be located in an enclosure that is cantilevered off of the rear of the motor and may be air cooled. It is recognized that such an inverter orientation may not be an optimum configuration in terms of the enclosure required to achieve such a cantilevered orientation. Additionally, a motor in this configuration utilizing air cooling may comprise potting material and air fins to assist with cooling of the motor may lead to an even larger increase in mass of the system.

Some embodiments may include an electrical engine, wherein inverter modules may be mounted on the outside of a motor enclosure. Additional embodiments may include an electrical engine wherein an inverter may be mounted on top of an electrical motor such that the air-cooling fins of the inverter are underneath the propeller. Further embodiments may include an inverter mounted to the back of a motor with air-cooling fins facing out radially, an inverter mounted to the front of a motor with the air-cooling fins facing out radially, an inverter mounted to a motor where the inverter is cooled by a liquid, such as oil, or any other position of the inverter relative to a motor.

Embodiments of an electrical motor may comprise a stator enclosure, a wound stator assembly, a rotor, various bearings, and any additional components such that to assist in transferring the speed and torque generated by the motor to a propeller.

It is understood that an electrical engine may generate heat during operation and may comprise a heat management system to ensure components of the electrical engine do not fail during operation. In some embodiments, coolant may be used and circulated throughout individual components of the engine, such as an inverter, gearbox, or motor, through some of the components, or through all of the components of the engine to assist with managing the heat present in the engine. Additional embodiments may include using air cooling methods to cool the electrical engine or using a mixture of coolant and air to manage the heat generated during operation in the electrical engine. In some embodiments, the coolant being used may also be the same liquid that is being used as lubricant throughout the inverter, gearbox, or motor. For example, the inverter, gearbox, and motor may be cooled using a liquid or air, or a mixture of air and liquid cooling could be used, such as cooling the motor using air cooling and using liquid cooling in the inverter and gearbox, or any other combination of air and liquid cooling across the inverter, gearbox, and motor or even subsets of those components.

In some embodiments, oil may be used as a lubricant throughout an electrical engine and may also be used as coolant fluid to assist in managing the heat generated by the engine during operation. Further to this example, different amounts of oil may be used to act as both lubricant and coolant fluid in the electrical engine, such as less than one quart, less than two quarts, or any other amount of oil needed to lubricate and cool the electrical engine, in combination with or without the assistance of air cooling. As has been disclosed herein, an electrical engine may have different primary functionalities such as being used only for lifting and landing, and as such only being used in one orientation, or being used during all stages of flight such as lifting, landing, and in-flight. An engine that is used in all stages of flight may experience various orientations throughout flight and may comprise more lubricant and coolant than the engine only used in one orientation. As such, all the engines on an aircraft may not include the same amount of lubricant and coolant. For example, a lifting and landing engine may only require less than one quart of oil while an engine that operates in all stages of flight may require more than one quart of oil. It should be understood that the example embodiments as mentioned herein are representative and do not dictate the bounds of the amount of lubricant and coolant that may be used in an electrical engine.

It is understood that by using oil to not only lubricate the electrical engine but also cool the electrical engine rather than another coolant, additional oil will be added to the system, but that oil will remove traditional components that may be used to cool such an electrical engine. For example, if the electrical engine were cooled by another liquid such as glycol, the engine may comprise separate heat exchangers for both the lubricant fluid and the coolant fluid. As such, in embodiments where a single fluid is being used for both lubrication and cooling, such as oil, an increase in oil would be present but there would only be a need for one heat exchanger, so there may be a decrease in mass, due to using less heat exchangers and potentially other components not being required, of the overall system and a more appealing drag profile may be present. Further, using one substance for the lubrication and cooling of the engine may increase efficiency of the system due to the reduction in mass and the benefits of cooling the engine with a substance rather than relying on air cooling which may have issues traveling throughout the engine.

Additional embodiments of electrical engines may possess various components to ensure any flammable fluids are monitored and prevented from entering certain sections of the electrical engine. Some embodiments may include an electric engine possessing a wet zone enclosure that may be defined by a gearbox, motor, and/or heat exchanger. In some embodiments, an electric engine may possess up to four or more liters of air within the motor-gearbox enclosure which is in contact with engine oil. For example, an electric engine may possess up to five liters, or six liters, or eight liters, or ten liters, or twenty liters of air within the motor-gearbox enclosure which is in contact with engine oil, based upon factors such as the size, number of propellers, or payload of the aircraft, etc. Embodiments of a motor-gearbox enclosure may equalize internal and external pressure using a breather. Embodiments of a breather may include it protruding above nearby design features in order to prevent inadvertent entry of external fluids. Additional embodiments may include a breather that possesses a screen and a circuitous entry path to prevent entry of external debris. Embodiments may include a sight glass being present on both the tilt and lift electric engines in order to check that oil is not overfilled or underfilled during servicing.

Additional embodiments of electrical engines may include active protection features in the forward and aft electrical engines such as monitoring internal temperatures throughout the engine operation, including oil temperature, stator winding sets, inverter bulk capacitors, power modules, control board power modules, control board control processors, control board monitor processors, internal hot-spots, and other various locations throughout the engine. Embodiments may include overtemperature limits that take into account known failure temperatures and operating limits in relation to auto-ignition temperatures of fluids. Some embodiments may include a High Voltage Power System that may have fuses at the high voltage battery terminals which may rapidly disconnect the engine electrical connection irreversibly to mitigate overcurrent events. This overcurrent protection may be activated when the electric engine current draw is greater than the Overcurrent operating. As such, in some embodiments, failure conditions which lead to overcurrent may only lead to a transient overheating, arc or spark faults. Some embodiments may include a fire threat characterization test ignition source that may be selected to be a more severe ignition source than a short occurring in the electric engine and being opened by the engine fuse. In some embodiments, an inverter will detect AC overcurrent and isolate the erroneous phase and/or will continuously monitor input DC voltage, and will apply protective actions to keep voltages under the overvoltage operating limit.

A. Exemplary Electric Aircraft Features

Figure 2:
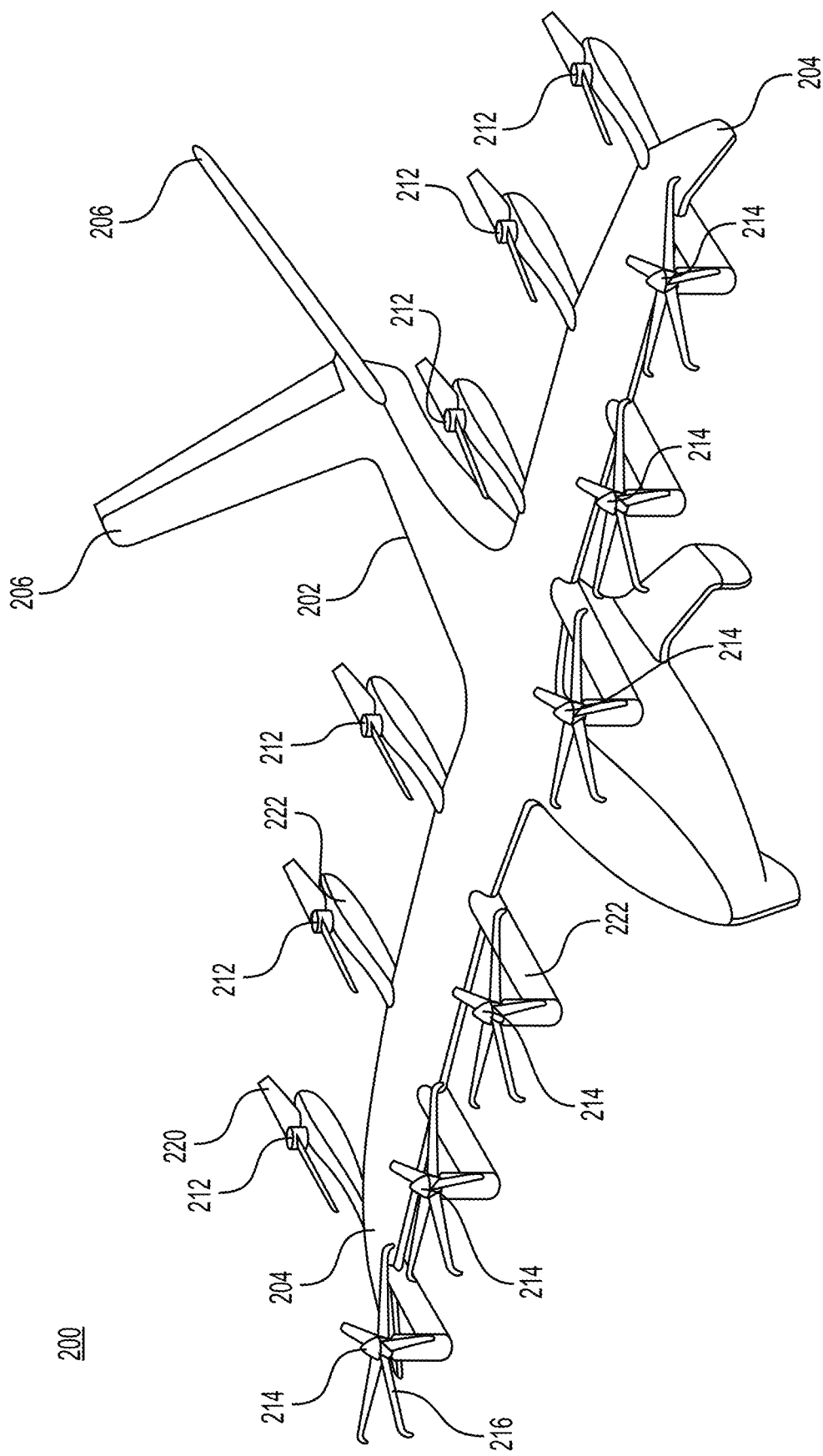
FIG. 2 is another illustration of a perspective view of an exemplary VTOL aircraft in an alternative configuration, consistent with some embodiments of the present disclosure.

FIG. 1 is an illustration of a perspective view of an exemplary VTOL aircraft, consistent with disclosed embodiments. FIG. 2 is another illustration of a perspective view of an exemplary VTOL aircraft in an alternative configuration, consistent with embodiments of the present disclosure. FIGS. 1 and 2 illustrate a VTOL aircraft 100, 200 in a cruise configuration and a vertical take-off, landing and hover configuration (also referred to herein as a "lift" configuration), respectively, consistent with embodiments of the present disclosure. Elements corresponding to FIGS. 1 and 2 may possess like numerals and refer to similar elements of the aircrafts 100, 200. The aircraft 100, 200 may include a fuselage 102, 202, wings 104, 204 mounted to the fuselage 102, 202 and one or more rear stabilizers 106, 206 mounted to the rear of the fuselage 102, 202. A plurality of lift propellers 112, 212 may be mounted to wings 104, 204 and may be configured to provide lift for vertical take-off, landing and hover. A plurality of tilt propellers 114, 214 may be mounted to wings 104, 204 and may be tiltable between the lift configuration in which they provide a portion of the lift required for vertical take-off, landing and hovering, as shown in FIG. 2, and the cruise configuration in which they provide forward thrust to aircraft 100 for horizontal flight, as shown in FIG. 1. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 112, 212 may be configured for providing lift only, with all horizontal propulsion being provided by the tilt propellers. Accordingly, lift propellers 112, 212 may be configured with fixed positions and may only generate thrust during take-off, landing and hover phases of flight. Meanwhile, tilt propellers 114, 214 may be tilted upward into a lift configuration in which thrust from propellers 114, 214 is directed downward to provide additional lift.

For forward flight, tilt propellers 114, 214 may tilt from their lift configurations to their cruise configurations. In other words, the orientation of tilt propellers 114, 214 may be varied from an orientation in which the tilt propeller thrust is directed downward (to provide lift during vertical take-off, landing and hover) to an orientation in which the tilt propeller thrust is directed rearward (to provide forward thrust to aircraft 100, 200). The tilt propellers assembly for a particular electric engine may tilt about an axis of rotation defined by a mounting point connecting the boom and the electric engine. When the aircraft 100, 200 is in full forward flight, lift may be provided entirely by wings 104, 204. Meanwhile, in the cruise configuration, lift propellers 112, 212 may be shut off. The blades 120, 220 of lift propellers 112, 212 may be held in low-drag positions for aircraft cruising. In some embodiments, lift propellers 112, 212 may each have two blades 120, 220 that may be locked for cruising in minimum drag positions in which one blade is directly in front of the other blade as illustrated in FIG. 1. In some embodiments, lift propellers 112, 212 have more than two blades. In some embodiments, tilt propellers 114, 214 may include more blades 116, 216 than lift propellers 112, 212. For example, as illustrated in FIGS. 1 and 2, lift propellers 112, 212 may each include, e.g., two blades, whereas and tilt propellers 114, 214 may each include more blades, such as the five blades shown. In some embodiments, each of the tilt propellers 114, 214 may have 2 to 5 blades, and possibly more depending on the design considerations and requirements of the aircraft.

In some embodiments, the aircraft may include a single wing 104, 204 on each side of fuselage 102, 202 (or a single wing that extends across the entire aircraft). At least a portion of lift propellers 112, 212 may be located rearward of wings 104, 204 and at least a portion of tilt propellers 114, 214 may be located forward of wings 104, 204. In some embodiments, all of lift propellers 112, 212 may be located rearward of wings 104, 204 and all of tilt propellers 114, 214 may be located forward of wings 104, 204. According to some embodiments, all lift propellers 112, 212 and tilt propellers 114, 214 may be mounted to the wings—i.e., no lift propellers or tilt propellers may be mounted to the fuselage. In some embodiments, lift propellers 112, 212 may be all located rearwardly of wings 104, 204 and tilt propellers 114, 214 may be all located forward of wings 104, 204. According to some embodiments, all lift propellers 112, 212 and tilt propellers 114, 214 may be positioned inwardly of the ends of the wing 104, 204.

In some embodiments, lift propellers 112, 212 and tilt propellers 114, 214 may be mounted to wings 104, 204 by booms 122, 222. Booms 122, 222 may be mounted beneath wings 104, 204, on top of the wings, and/or may be integrated into the wing profile. In some embodiments, lift propellers 112, 212 and tilt propellers 114, 214 may be mounted directly to wings 104, 204. In some embodiments, one lift propeller 112, 212 and one tilt propeller 114, 214 may be mounted to each boom 122, 222. Lift propeller 112, 212 may be mounted at a rear end of boom 122, 222 and tilt propeller 114, 214 may be mounted at a front end of boom 122, 222. In some embodiments, lift propeller 112, 212 may be mounted in a fixed position on boom 122, 222. In some embodiments, tilt propeller 114, 214 may mounted to a front end of boom 122, 222 via a hinge. Tilt propeller 114, 214 may be mounted to boom 122, 222 such that tilt propeller 114, 214 is aligned with the body of boom 122, 222 when in its cruise configuration, forming a continuous extension of the front end of boom 122, 222 that minimizes drag for forward flight.

In some embodiments, aircraft 100, 200 may include, e.g., one wing on each side of fuselage 102, 202 or a single wing that extends across the aircraft. According to some embodiments, the at least one wing 104, 204 is a high wing mounted to an upper side of fuselage 102, 202. According to some embodiments, the wings include control surfaces, such as flaps and/or ailerons. According to some embodiments, wings 104, 204 may have designed with a profile that reduces drag during forward flight. In some embodiments, the wing tip profile may be curved and/or tapered to minimize drag.

In some embodiments, rear stabilizers 106, 206 include control surfaces, such as one or more rudders, one or more elevators, and/or one or more combined rudder-elevators. The wing(s) may have any suitable design. In some embodiments, the wings have a tapering leading edge.

In some embodiments, lift propellers 112, 212 or tilt propellers 114, 214 may canted relative to at least one other lift propeller 112, 212 or tilt propeller 114, 214. As used herein, canting refers to a relative orientation of the rotational axis of the lift propeller/tilt propeller about a line that is parallel to the forward-rearward direction, analogous to the roll degree of freedom of the aircraft. Canting of the lift propellers and/or tilt propellers may help minimize damage from propeller burst by orienting a rotational plane of the lift propeller/tilt propeller discs (the blades plus the hub onto which the blades are mounted) so as to not intersect critical portions of the aircraft (such areas of the fuselage in which people may be positioned, critical flight control systems, batteries, adjacent propellers, etc.) or other propeller discs and may provide enhanced yaw control during flight.

Figure 3:
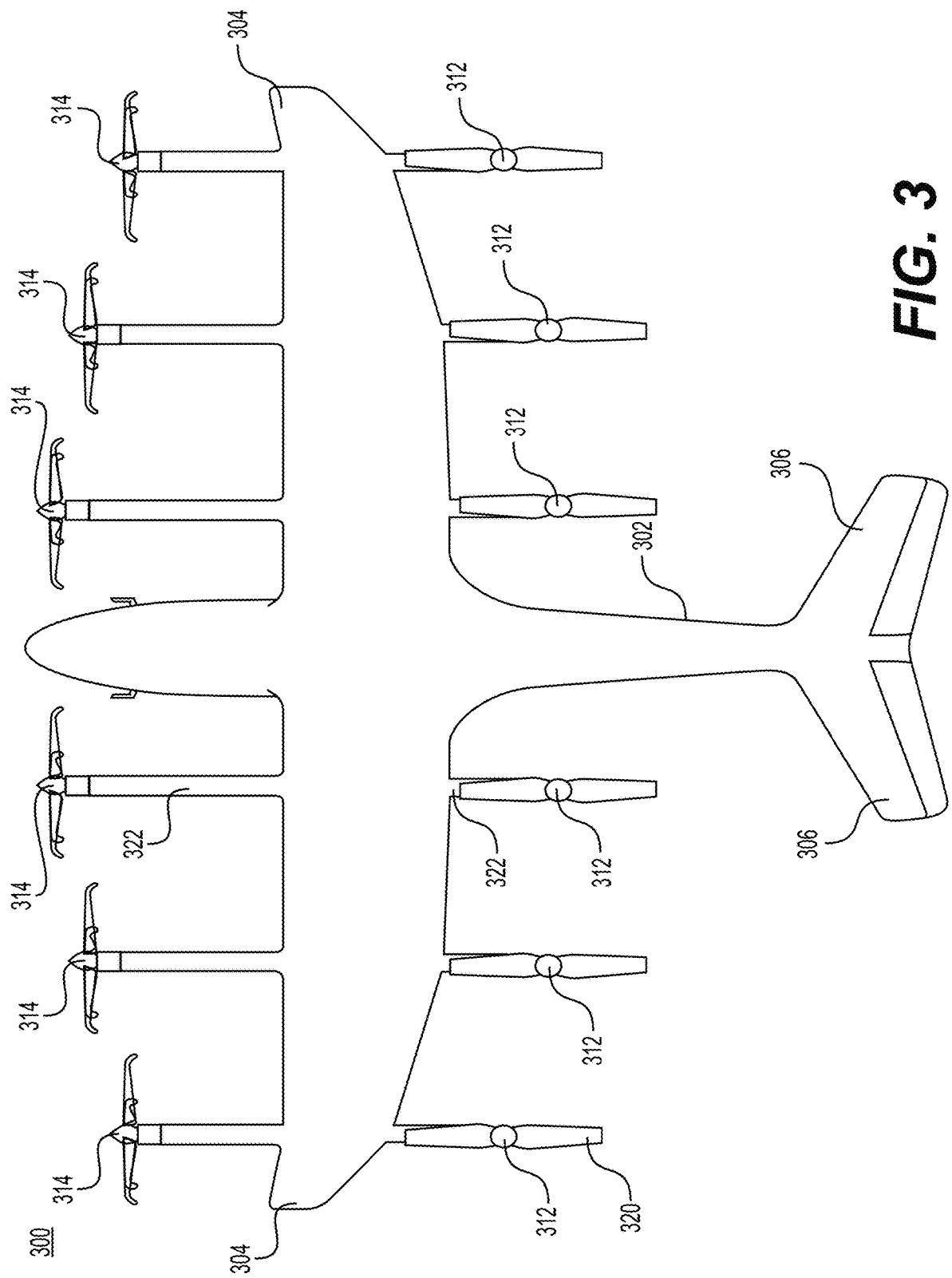
FIG. 3 is an illustration of a top plan view of an exemplary VTOL aircraft, consistent with some embodiments of the present disclosure.

FIG. 3 is an illustration of a top plane view of an exemplary VTOL aircraft, consistent with embodiments of the present disclosure. Aircraft 300 shown in the figure may be a top plan view of the aircraft 100, 200 shown in FIGS. 1 and 2, respectively. As discussed herein, an aircraft 300 may include twelve electric propulsion systems distributed across the aircraft 300. In some embodiments, a distribution of electric propulsion systems may include six forward electric propulsion systems 314 and six aft electric propulsion systems 312 mounted on booms forward and aft of the main wings 304 of the aircraft 300. In some embodiments, a length of the rear end of the boom 324 from the wing 304 to the lift propeller may comprise a similar rear end of the boom 324 length across the numerous rear ends of the booms. In some embodiments, the length of the rear ends of the booms may vary across the, exemplary, six rear ends of the booms. For example, each rear end of the boom 324 may comprise a different length from the wing 304 to the lift propeller, or a subset of rear ends of booms may be similar in length. In some embodiments, a front end of boom 322 may comprise various lengths from the wing 304 to the tilt propeller across the front ends of booms. For example, as shown in FIG. 3, a length of the front end of boom 322 from the tilt propellers nearest the fuselage to the wing 304 may comprise a greater length than the length of the front end of the boom 322 from the wing 304 to the tilt propellers furthest from the fuselage. Some embodiments may include front ends of the booms with similar lengths across the, exemplary, six front ends of booms or any other distribution of lengths of the front ends of booms from the wing 304 to tilt propellers. Some embodiments may include an aircraft 300 possessing eight electric propulsion systems with four forward electric propulsion systems 314 and four aft electric propulsion systems 312, or any other distribution of forward and aft electric propulsion systems, including embodiments where the number of forward electric propulsion systems 314 is less than or greater than the number of aft electric propulsion systems 312. Further, FIG. 3 depicts an exemplary embodiment of a VTOL aircraft 300 with forward propellers in a horizontal orientation for horizontal flight and aft propeller blades 320 in a stowed position for a forward phase of flight.

As disclosed herein, the forward electric propulsion systems and aft electric propulsion systems may be of a clockwise (CW) type or counterclockwise (CCW) type. Some embodiments may include various forward electric propulsion systems possessing a mixture of both CW and CCW types. In some embodiments, the aft electric propulsion systems may possess a mixture of CW and CCW type systems among the aft electric propulsion systems.

Figure 4:
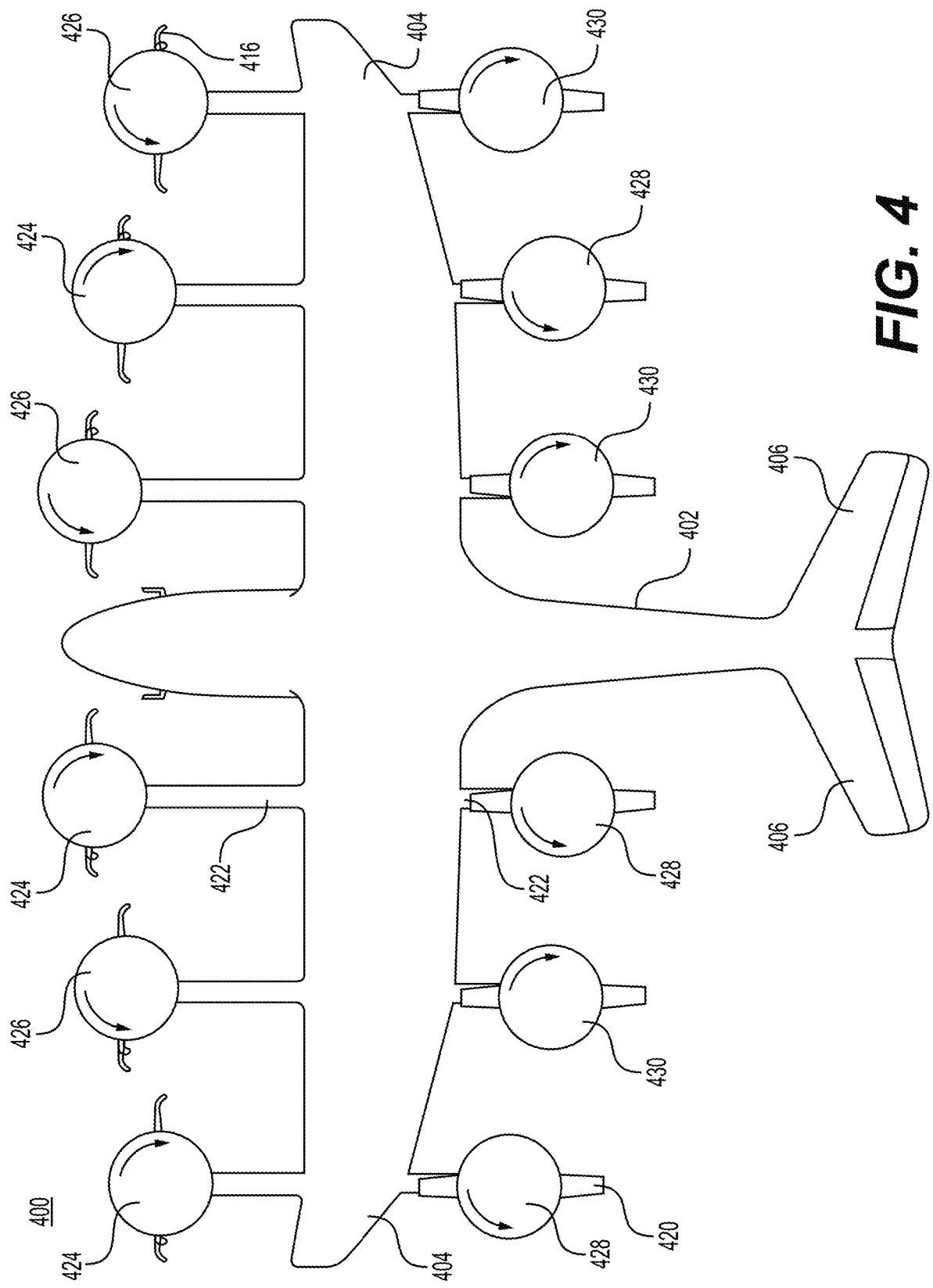
FIG. 4 is a schematic diagram illustrating exemplary propeller rotation of a VTOL aircraft, consistent with some embodiments of the present disclosure.

FIG. 4 is a schematic diagram illustrating exemplary propeller rotation of a VTOL aircraft, consistent with disclosed embodiments. Aircraft 400 shown in the figure may be a top plan view of the aircraft 100, 200, and 300 shown in FIGS. 1, 2, and 3, respectively. An aircraft 400 may include six forward electric propulsion systems with three of the forward electric propulsion systems being of CW type 424 and the remaining three forward electric propulsion systems being of CCW type. In some embodiments, three aft electric propulsion systems may be of CCW type 428 with the remaining three aft electric propulsion systems being of CW type 430. Some embodiments may include an aircraft 400 possessing four forward electric propulsion systems and four aft electric propulsion systems, each with two CW types and two CCW types. In some embodiments, propellers may counter-rotate with respect to adjacent propellers to cancel torque steer, generated by the rotation of the propellers, experienced by the fuselage or wings of the aircraft. In some embodiments, the difference in rotation direction may be achieved using the direction of engine rotation. In other embodiments, the engines may all rotate in the same direction, and gearing may be used to achieve different propeller rotation directions.

Some embodiments may include an aircraft 400 possessing forward and aft electric propulsion systems where the amount of CW types 424 and CCW types 426 is not equal among the forward electric propulsion systems, among the aft electric propulsion systems, or among the forward and aft electric propulsion systems.

Figure 5:
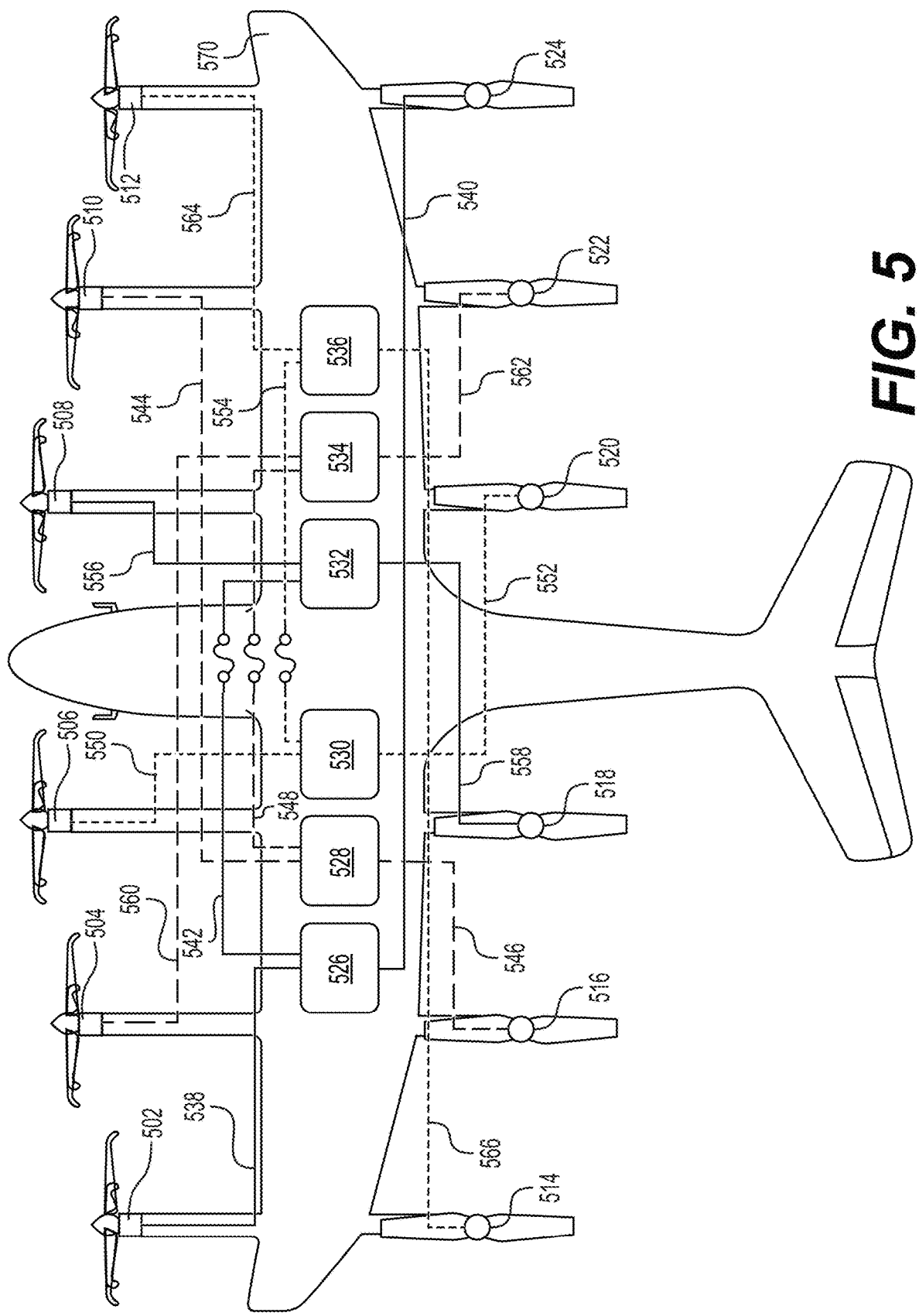
FIG. 5 is a schematic diagram illustrating exemplary power connections in a VTOL aircraft, consistent with some embodiments of the present disclosure.

FIG. 5 is a schematic diagram illustrating exemplary power connections in a VTOL aircraft, consistent with disclosed embodiments. A VTOL aircraft may have various power systems connected to diagonally opposing electric propulsion systems. In some embodiments, the power systems may include high voltage power systems. Some embodiments may include high voltage power systems connected to electric engines via high voltage channels. In some embodiments, an aircraft 500 may include six power systems 526, 528, 530, 532, 534, and 536, including batteries stored within the wing 570 of the aircraft 500. In some embodiments, the aircraft 500 may include six forward electric propulsion systems having six electric engines 502, 504, 506, 508, 510, and 512 and six aft electric propulsion systems having six electric engines 514, 516, 518, 520, 522, and 524. In some embodiments, a battery may be connected to diagonally opposing electric engines. In such a configuration, first power system 526 may provide power to electric engines 502 via power connection channel 538 and electric engine 524 via power connection channel 540. In some embodiments, first power system 526 may also be paired with a fourth power system 532 via a power connection channel 542 possessing a fuse to prevent excessive current from flowing through the power systems 526 and 532. Further to this embodiment, VTOL aircraft 500 may include a second power system 528 paired with a fifth power system 534 via power connection channel 548 possessing a fuse and may provide power to electric engines 510 and 516 via power connection channels 544 and 546, respectively. In some embodiments, a third power system 530 may be paired with a sixth power system 536 via power connection channel 554 possessing a fuse and may provide power to electric engines 506 and 520 via power connection channels 550 and 552, respectively. The fourth power system 532 may also provide power to electric engines 508 and 518 via power connection channels 556 and 558, respectively. The fifth power system 534 may also provide power to electric engines 504 and 522 via power connection channels 560 and 562, respectively. The sixth power system 536 may also provide power to electric engines 512 and 514 via power connection channels 564 and 566, respectively.

As disclosed herein, an electric propulsion system may include an electric engine connected to a High Voltage Power System, such as a battery, located within the aircraft, via high voltage channels or power connection channels. Some embodiments may include various batteries being stored within an aircraft wing with high voltage channels traveling throughout the aircraft, including the wing and boom, to an electric propulsion system. In some embodiments, multiple high voltage power systems may be used to create an electric propulsion system with multiple high voltage power supplies to avoid the risk of a single point of failure. In some embodiments, an aircraft may include multiple electric propulsion systems that may be wired in a pattern to various batteries or power sources stored throughout the aircraft. It is recognized that such a configuration may be beneficial as to avoid the risk of a single point of failure where one battery or power source failure could lead to a portion of the aircraft not being able to maintain a required amount of thrust to continue flight or perform a controlled landing. For example, if a VTOL possessed two forward electric propulsion systems and two aft propulsion systems, the forward and the aft electric propulsion systems on opposite sides of the VTOL aircraft may be connected to the same high voltage power system. In such a configuration, if one high voltage power system were to fail, a forward and an aft electric propulsion system on opposite sides of the VTOL aircraft would remain in working order and may provide a more balanced flight or landing compared to a forward and aft electric propulsion system failing on the same side of a VTOL aircraft. Some embodiments may include four forward electric propulsion systems and four aft electric propulsion systems where diagonally opposing electric engines are connected to a common battery or power source. Some embodiments may include various configurations of electric engines electrically connected to high voltage power systems such that a risk of a single point of failure is avoided in the case of a power source failure and the phase of flight during which a failure occurs may continue or the aircraft may perform an alternative phase of flight in response to the failure.

As discussed above, an electric propulsion system may include an electric engine that provides mechanical shaft power to a propeller assembly to produce thrust. In some embodiments, the electric engine of an electric propulsion system may include a High Voltage Power System supplying high voltage power to the electric engines and/or a Low Voltage System supplying low voltage direct current power to an electric engine. Some embodiments may include the electric engine(s) digitally communicating with a Flight Control System ("FCS") comprising Flight Control Computers ("FCC") that may send and receive signals to and from the electric engine including commands and responsive data or status. Some embodiments may include an electric engine capable of receiving operating parameters from and communicating operating parameters to the FCC, including speed, voltage, current, torque, temperature, vibration, propeller position, and any other value of operating parameters.

In some embodiments, a flight control system may include a system capable of communicating with an electric engine to send and receive analog/discrete signals to the electric engine and controlling an apparatus capable of redirecting thrust of the tilt propellers between a primarily vertical direction during vertical flight mode to a mostly horizontal direction during forward-flight mode. In some embodiments, this system may be referred to as a Tilt Propeller System ("TPS") and may be capable of communicating and orienting additional features of the electric propulsion system.

Figure 6:
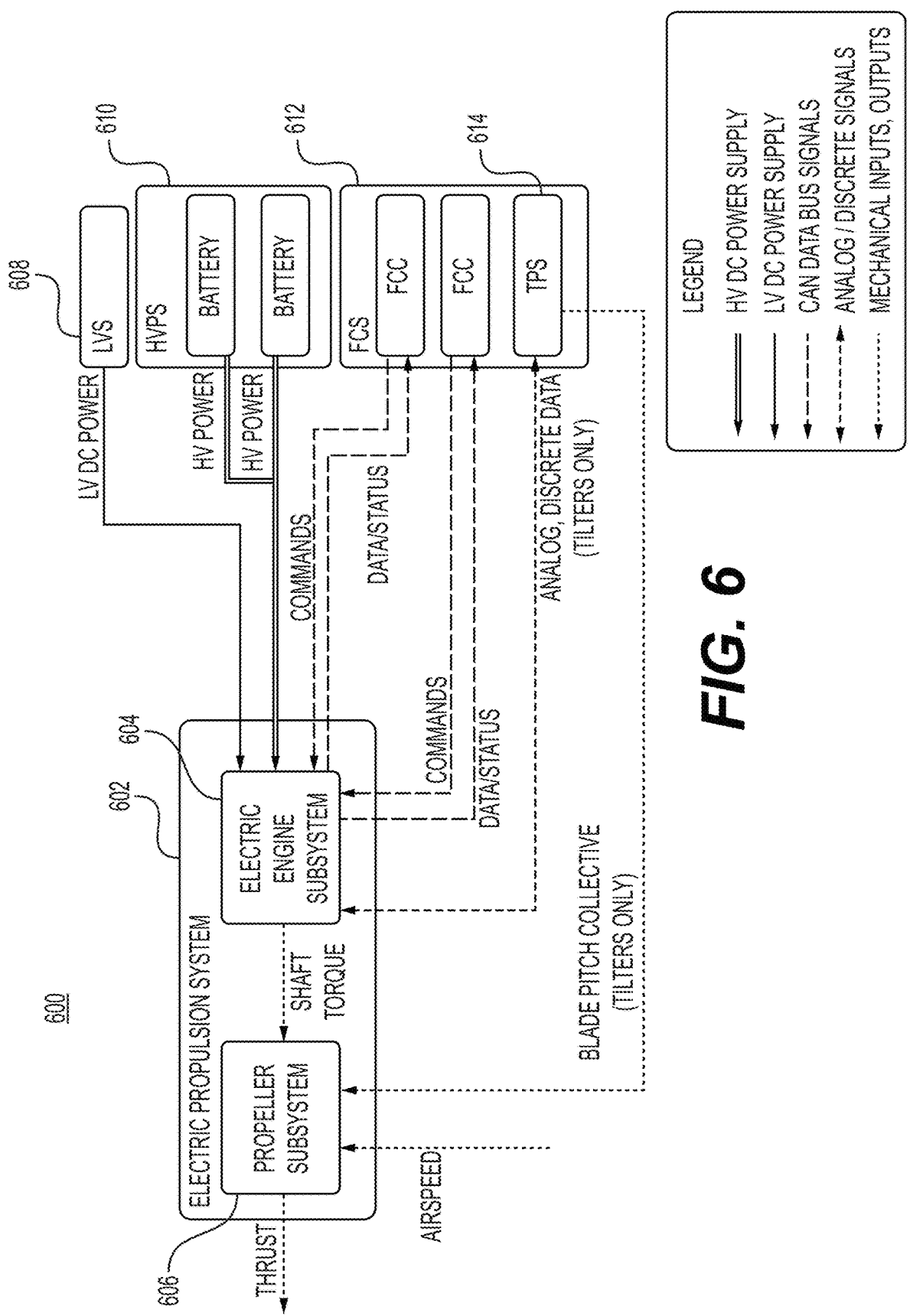
FIG. 6 is a block diagram illustrating an exemplary architecture and design of an electric propulsion unit of a VTOL aircraft, consistent with some embodiments of the present disclosure.

FIG. 6 illustrates block diagram of an exemplary architecture and design of an electric propulsion unit 600 consistent with disclosed embodiments. In some embodiments, an electric propulsion system 602 may include an electric engine subsystem 604 that may supply torque, via a shaft, to a propeller subsystem 606 to produce the thrust of the electric propulsion system 602. Some embodiments may include the electric engine subsystem 604 receiving low voltage DC (LV DC) power from a Low Voltage System (LVS) 608. Some embodiments may include the electric engine subsystem 604 receiving high voltage (HV) power from a High Voltage Power System (HVPS) 610 comprising at least one battery or other device capable of storing energy. In some embodiments, a High Voltage Power System may include more than one battery, or other device capable of storing energy, supplying high voltage power to the electric engine subsystem 604. It is recognized that such a configuration may be advantageous as to not risk a single point of failure where a single battery failure leads to an electric propulsion system 602 failure.

Some embodiments may include an electric propulsion system 602 including an electric engine subsystem 604 receiving signals from and sending signals to a flight control system 612. In some embodiments, a flight control system 612 may comprise a flight control computer capable of using Controller Area Network ("CAN") data bus signals to send commands to the electric engine subsystem 604 and receive status and data from the electric engine subsystem 604. It should be understood that while CAN data bus signals are used between the flight control computer and the electric engine(s), some embodiments may include any form of communication with the ability to send and receive data from a flight control computer to an electric engine. In some embodiments, a flight control system 612 may also include a Tilt Propeller System ("TPS") 614 capable of sending and receiving analog, discrete data to and from the electric engine subsystem 604 of the tilt propellers. A tilt propeller system 614 may include an apparatus capable of communicating operating parameters to an electric engine subsystem 604 and articulating an orientation of the propeller subsystem 606 to redirect the thrust of the tilt propellers during various phases of flight using mechanical means such as a gearbox assembly, linear actuators, and any other configuration of components to alter an orientation of the propeller subsystem 606.

As discussed throughout, an exemplary VTOL aircraft may possess various types of electric propulsion systems including tilt propellers and lift propellers, including forward electric engines with the ability to tilt during various phases of flight, and aft electric engines that remain in one orientation and may only be active during certain phases of flight (i.e., take off, landing, and hover).

Figure 7:
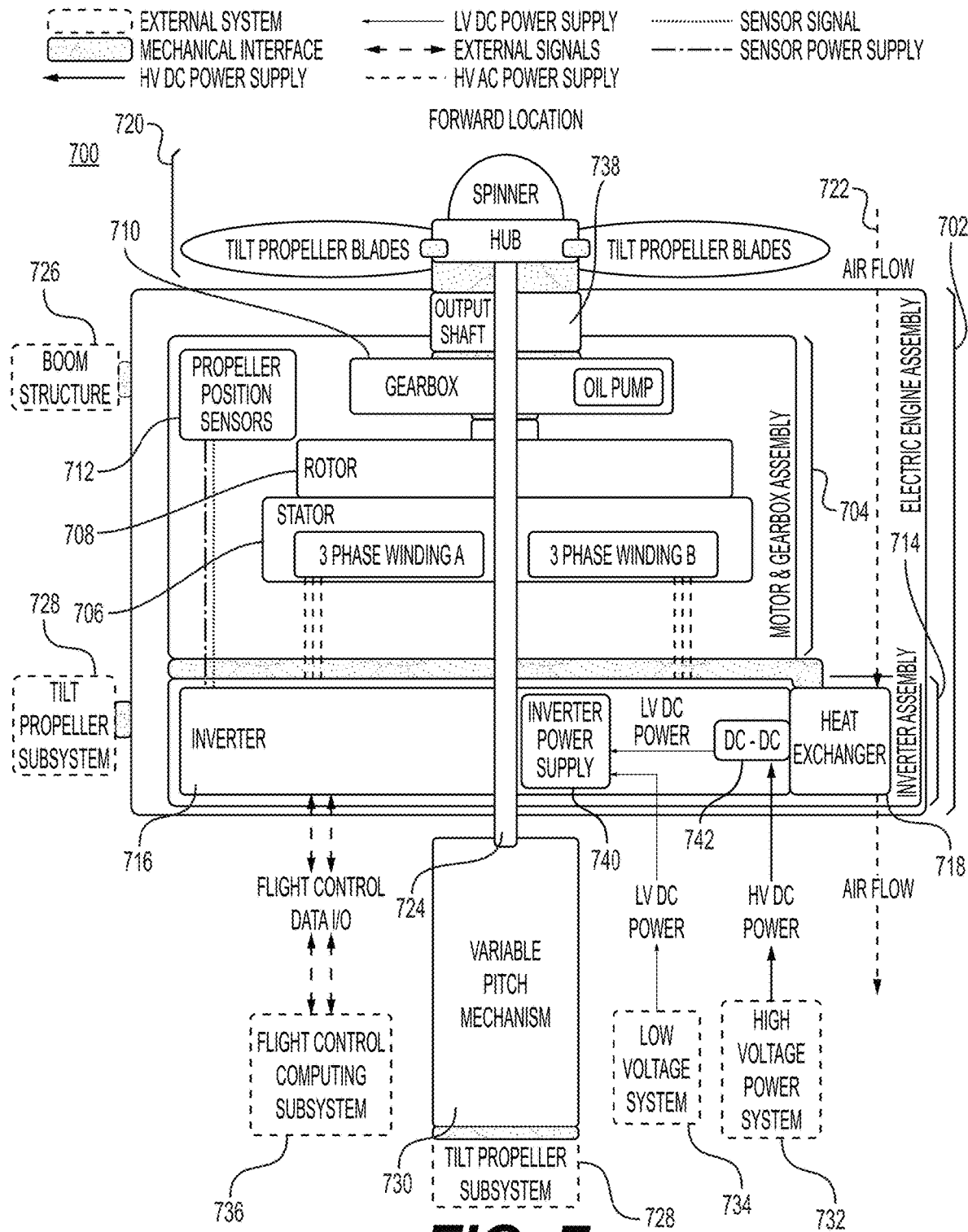
FIG. 7 is a schematic diagram illustrating an exemplary tilt electric propulsion system of a VTOL aircraft, consistent with some embodiments of the present disclosure.

FIG. 7 is a schematic diagram illustrating an exemplary tilt electric propulsion system of a VTOL aircraft, consistent with disclosed embodiments. A tiltable electric propulsion system 700 may include an electric engine assembly 702 aligned along a shaft 724 that is connected to an output shaft 738 that is mechanically coupled to a propeller assembly 720 comprising a hub, a spinner, and tilt propeller blades. In some embodiments, an electric engine assembly 702 may include a motor and gearbox assembly 704 aligned along and mechanically coupled to the shaft 724. In some embodiments, a motor and gearbox assembly 704 may include an electric motor assembly comprising a stator 706 and a rotor 708. As shown in FIG. 7, and present in some embodiments, a stator 706 may include multiple stator windings connected to the inverter 716. In such a configuration, a stator 706 may incorporate one or more redundances so that, in the event one set of windings were to fail, power would still be transmitted to the stator 706 via one or more remaining windings, so that the electric engine assembly 702 retains power and continues to generate thrust at the propeller assembly 720.

In some embodiments, a motor and gearbox assembly 704 may contain a gearbox 710 aligned along the shaft 724 to provide a gear reduction between the torque of the shaft 724 from the electric engine assembly, comprising a stator 706 and rotor 708, and the output shaft 738 Torque applied to the output shaft 738 may be transferred to the propeller assembly 720. Some embodiments may include a gearbox 710 containing an oil pump. In such an embodiment, the oil pump may drive a circulation of oil throughout the motor and gearbox assembly 704 at a speed equivalent to the rotation of the output shaft 738 to cool and lubricate the gearbox and electric motor components. In some embodiments, the oil pump may drive a circulation of oil at a speed greater than or less than the rotation of the output shaft 738. Some embodiments of a motor and gearbox assembly 704 may include propeller position sensors 712 present within the housing that may detect a magnetic field produced by the electric engine assembly to determine a propeller position. Further embodiments may include propeller position sensors 712 that are powered by an inverter 716 and send collected data to an inverter 716.

In some embodiments, an electric engine assembly 702 may also include an inverter assembly 714 substantially aligned along the shaft 724. An inverter assembly 714 may include an inverter 716 and an inverter power supply 740 An inverter power supply 740 may accept low voltage DC power from a low voltage system 734 located outside the electric engine assembly 702. An inverter power supply 740 may accept low voltage DC power originating from a high voltage power system 732, located outside the electric engine assembly 702, that has been converted to low voltage DC power via a DC-DC converter 742. An inverter 716 may supply high voltage alternating current (AC) to the stator 706 of the electric engine assembly located within the motor and gearbox assembly 704 via at least one three-phase winding. An inverter assembly 714 may include an inverter 716 that may receive flight control data from a flight control computing subsystem 736.

In some embodiments, a motor and gearbox 704 may be located between an inverter assembly 714 and a propeller assembly 720. Some embodiments may also include a divider plate 744 coupled to the motor and gearbox assembly 704 and inverter assembly 714. A divider plate 744 may create an enclosed environment for an upper portion of the motor and gearbox assembly 704 via an end bell assembly, and create an enclosed environment for a lower portion of the inverter assembly 714 via a thermal plate. In some embodiments, divider plate 744 may serve as an integral mounting bracket for supporting heat exchanger 718. Heat exchanger 718 may comprise, for example, a folded fin or other type of heat exchanger. In some embodiments, the electric propulsion system 700 may circulate oil or other coolant throughout the electric engine assembly 702, motor and gearbox assembly 704, or inverter assembly 714 to transfer heat generated from the components to the oil or other coolant liquid. The heated oil or other coolant liquid may circulate through heat exchanger 718 to transfer the heat to an air flow 722 passing through the fins of the heat exchanger.

In some embodiments, the electric engine assembly 702 may be mounted or coupled to a boom structure 726 of the aircraft. A variable pitch mechanism 730 may be mechanically coupled to the propeller assembly 720. In some embodiments, the variable pitch mechanism may abut the electric engine assembly 702. In some embodiments, the variable pitch mechanism 730 may be coupled to the variable pitch mechanism 730 such it may be remotely mounted within the boom, wing, or fuselage of the aircraft. In some embodiments, the variable pitch mechanism 730 may include a shaft or component traveling within or adjacent to the shaft 724 to the propeller assembly 720. A variable pitch mechanism 730 may serve to change the collective angle of the forward electric engine's propeller assembly blades as needed for operation during the hover-phase, transition phase, and cruise-phase. Some embodiments may include the electric engine assembly 702 being mechanically coupled to a tilt propeller subsystem 728 that may redirect thrust between a primarily vertical direction during vertical flight mode to a mostly horizontal direction during forward-flight mode. In some embodiments, the tilt propeller subsystem may abut the variable pitch mechanism 730. Some embodiments may include a tilt propeller subsystem 728 comprising various components located in various locations. For example, a component of the tilt propeller subsystem may be coupled to the electric engine assembly 702 and other components may be coupled to the variable pitch mechanism 730. These various components of the tilt propeller subsystem 728 may work together to redirect the thrust of the tiltable electric propulsion system 700.

Figures 8A, 8B, 8C:
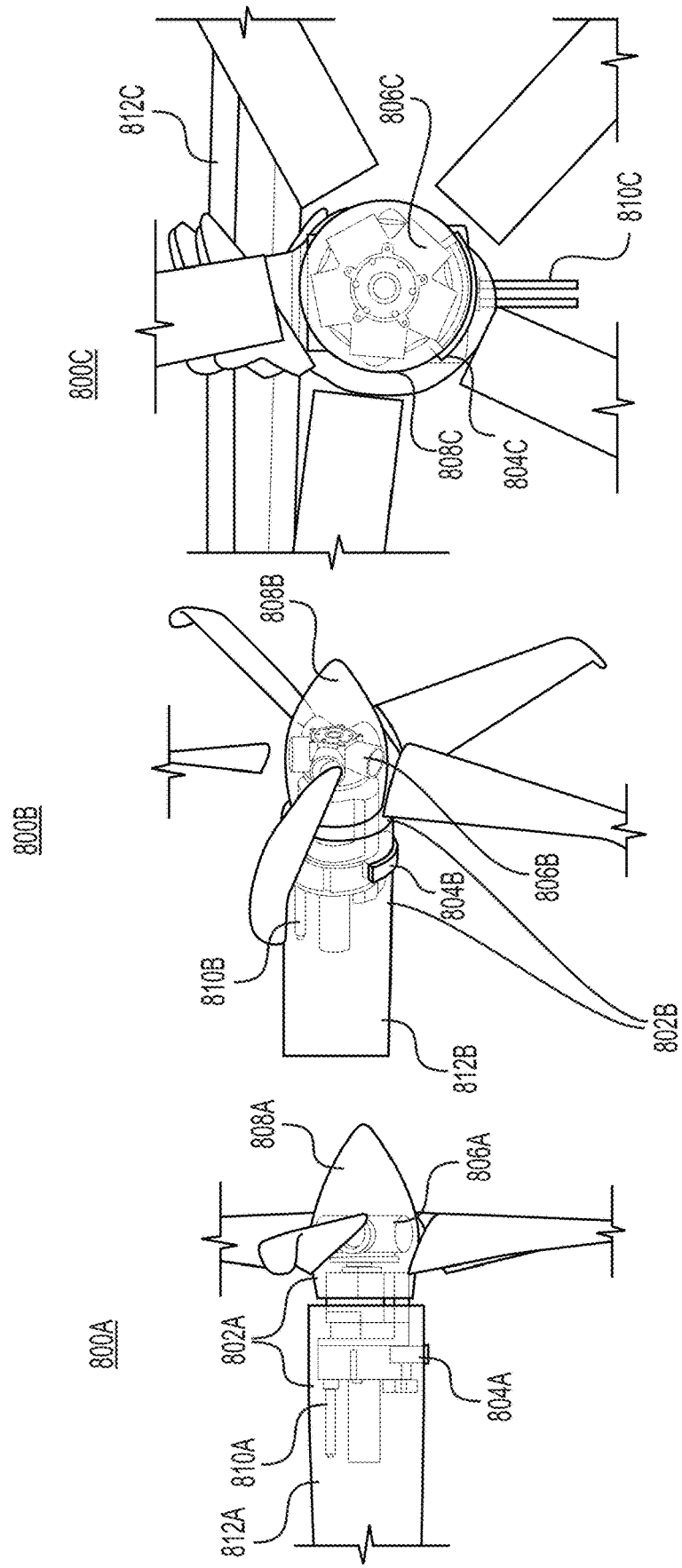
FIGS. 8A-8C are illustrations of an exemplary tilt electric propulsion system of a VTOL aircraft, consistent with some embodiments of the present disclosure.

FIGS. 8A-8C are illustrations of an exemplary tilt electric propulsion system of a VTOL aircraft, consistent with disclosed embodiments. FIGS. 8A-8C possess like numerals and refer to similar elements of tiltable electric propulsion systems 800A, 800B, and 800C. As such, similar design considerations and configurations may be considered throughout the embodiments.

FIGS. 8A and 8B illustrate a side profile and perspective view, respectively, of a tiltable electric propulsion system 800A, 800B in a cruise configuration integrated into a boom 812A, 812B consistent with the present disclosure. A tiltable propeller electric propulsion system 800A, 800B may comprise an electric engine assembly 802A, 802B housed within a boom 812A, 812B of a VTOL aircraft. In some embodiments, a cruise configuration may include the electric engine assembly 802A, 802B being posited within the boom 812A, 812B. An electric engine assembly 802A, 802B may comprise an electric motor assembly, a gearbox assembly, an inverter assembly with power connection channels 810A, 810B, and a heat exchanger 804A, 804B, as described herein. The electric engine assembly 802A, 802B may be mechanically coupled to a propulsion assembly 808A, 808B comprising a shaft flange assembly 806A, 806B, a spinner, and propeller blades.

FIG. 8C illustrates a top-down view, along a spinner 808C, of a tiltable electric propulsion system 800C in a lift configuration integrated into a boom 812B consistent with the present disclosure. As shown in FIG. 8C a tiltable electric propulsion system 800C in a lift configuration may comprise the electric engine assembly 802A, 802B being posited outside of the boom 812C and changing its orientation with respect to the boom 812C.

As discussed herein, a lift electric propulsion system may be configured to provide thrust in one direction and may not provide thrust during all phases of flight. For example, a lift system may provide thrust during take-off, landing, and hover, but may not provide thrust during cruise.

Figure 9:
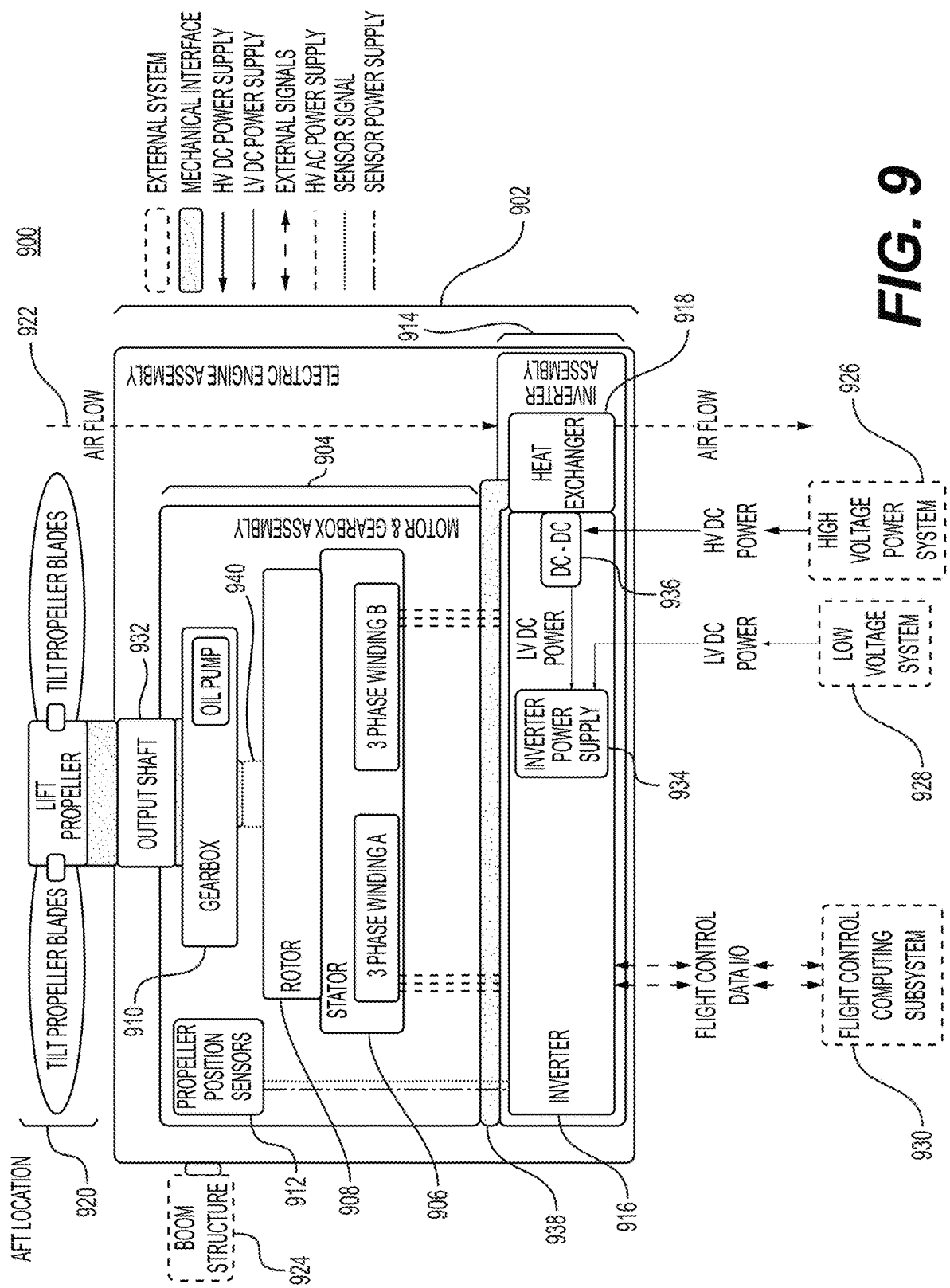
FIG. 9 is a schematic diagram illustrating an exemplary lift electric propulsion system of a VTOL aircraft, consistent with some embodiments of the present disclosure.

FIG. 9 is a schematic diagram illustrating an exemplary lift electric propulsion system of a VTOL aircraft, consistent with disclosed embodiments. A lift electric propulsion system 900 may be mounted or coupled to a boom structure 924 of the aircraft. A lift electric propulsion system 900 may include electric engine assembly 902 aligned along a shaft 940 that is connected to an output shaft 932 that is mechanically coupled to a propeller assembly 920 comprising a hub and tilt propeller blades. In some embodiments, an electric engine assembly 902 may include a motor and gearbox assembly housing 904 aligned along and mechanically coupled to the shaft 940. In some embodiments, a motor and gearbox assembly housing 904 may include an electric motor assembly comprising a stator 906 and a rotor 908. A stator 906 may include multiple stator windings connected to the inverter 916. In such a configuration, a stator 906 may incorporate one or more redundancies and backup measures to avoid a single point of failure in the case. For example, stator 906 may include multiple windings such that, if a winding fails, power may continue to be transmitted to the stator 906 via remaining windings, allowing the electric engine assembly 902 to retain power and continue to generate thrust at the propeller assembly 920.

In some embodiments, a motor and gearbox assembly housing 904 may contain a gearbox 910 aligned along the shaft 940 to provide a gear reduction between the torque of the shaft 932 from the electric engine assembly, comprising a stator 906 and rotor 908, and the output shaft 932. Torque applied to the output shaft 932 may be transferred to the propeller assembly 920. Some embodiments may include a gearbox 910 containing a fluid pump for circulating cooling and/or lubrication fluid. In the embodiment shown, the fluid pump is an oil pump. In such an embodiment, the oil pump may drive a circulation of oil throughout the motor and gearbox assembly housing 904 at a speed equivalent to the rotation of the output shaft 932 to cool and lubricate the gearbox and electric motor components. Some embodiments of a motor and gearbox assembly housing 904 may include propeller position sensors 912 present within the housing that may detect a magnetic field produced by the electric engine assembly to determine a propeller position. Further embodiments may include propeller position sensors 912 that are powered by an inverter 916 and send collected data to an inverter 916 that may be transferred to a flight control computing system 930 among other flight control data.

In some embodiments, an electric engine assembly 902 may also include an inverter assembly housing 914 aligned along an axis sharing the axis of the shaft. An inverter assembly housing 914 may include an inverter 916 and an inverter power supply 934. An inverter power supply 934 may accept low voltage DC power from a low voltage system 928 located outside the electric engine assembly 902. An inverter power supply 934 may accept low voltage DC power originating from a high voltage power system 926, located outside the electric engine assembly 902, that has been converted to low voltage DC power via a DC-DC converter 936. An inverter 916 may supply high voltage alternating current to the stator 906 of the electric engine assembly located within the motor and gearbox assembly housing 904 via at least one three-phase winding. An inverter assembly 914 may include an inverter 916 that may send data to and receive data from a flight control computing subsystem 930.

In some embodiments, a motor and gearbox housing 904 may be located between an inverter assembly housing 914 and a propeller assembly 920. Some embodiments may also include a divider plate 938 coupled to the motor and gearbox assembly housing 904 and inverter assembly housing 914. A divider plate 938 may create an enclosed environment for an upper portion of the motor and gearbox assembly housing 904 via an end bell assembly, and may create an enclosed environment for a lower portion of the inverter assembly housing 914 via a thermal plate. In some embodiments, a divider plate 938 may serve as an integral mounting bracket for supporting heat exchanger 918. Heat exchanger 918 may comprise, e.g., a folded fin or other type of heat exchanger. In some embodiments, the electric propulsion system 900 may circulate oil or other coolant fluid throughout the electric engine assembly 902, motor and gearbox assembly 904, or inverter assembly 914 to transfer heat generated from the components to the oil or other coolant liquid. The heated oil or other coolant liquid may be circulated through heat exchanger 918 to transfer the heat to an air flow 922 passing through the fins of the heat exchanger.

In some embodiments, a tiltable electric propulsion system and a lift electric propulsion system may possess similar components. This may be advantageous with respect to many design considerations present within VTOL aircrafts. For example, from a manufacturability standpoint, different types of electric propulsion systems having similar components may be beneficial in terms of manufacturing efficiency. Further, having similar components may be beneficial in terms of risk management as similar components possess similar points of failure and these points of failure may be well explored and designed around when comparing systems having similar components to systems having different components and configurations.

While a tiltable electric propulsion system may possess additional, and in some embodiments different, components compared to a lift electric propulsion system, it should be understood that in some embodiments a tiltable electric propulsion system and a lift electric propulsion system may possess the same configuration of components. For example, in some embodiments, a tiltable and lift electric propulsion system may contain the same components while the lift electric propulsion system may be coupled to a boom, wing, or fuselage of the aircraft such that it may not be able to provide thrust in as many directions as tiltable electric propulsion system.

Figure 10:
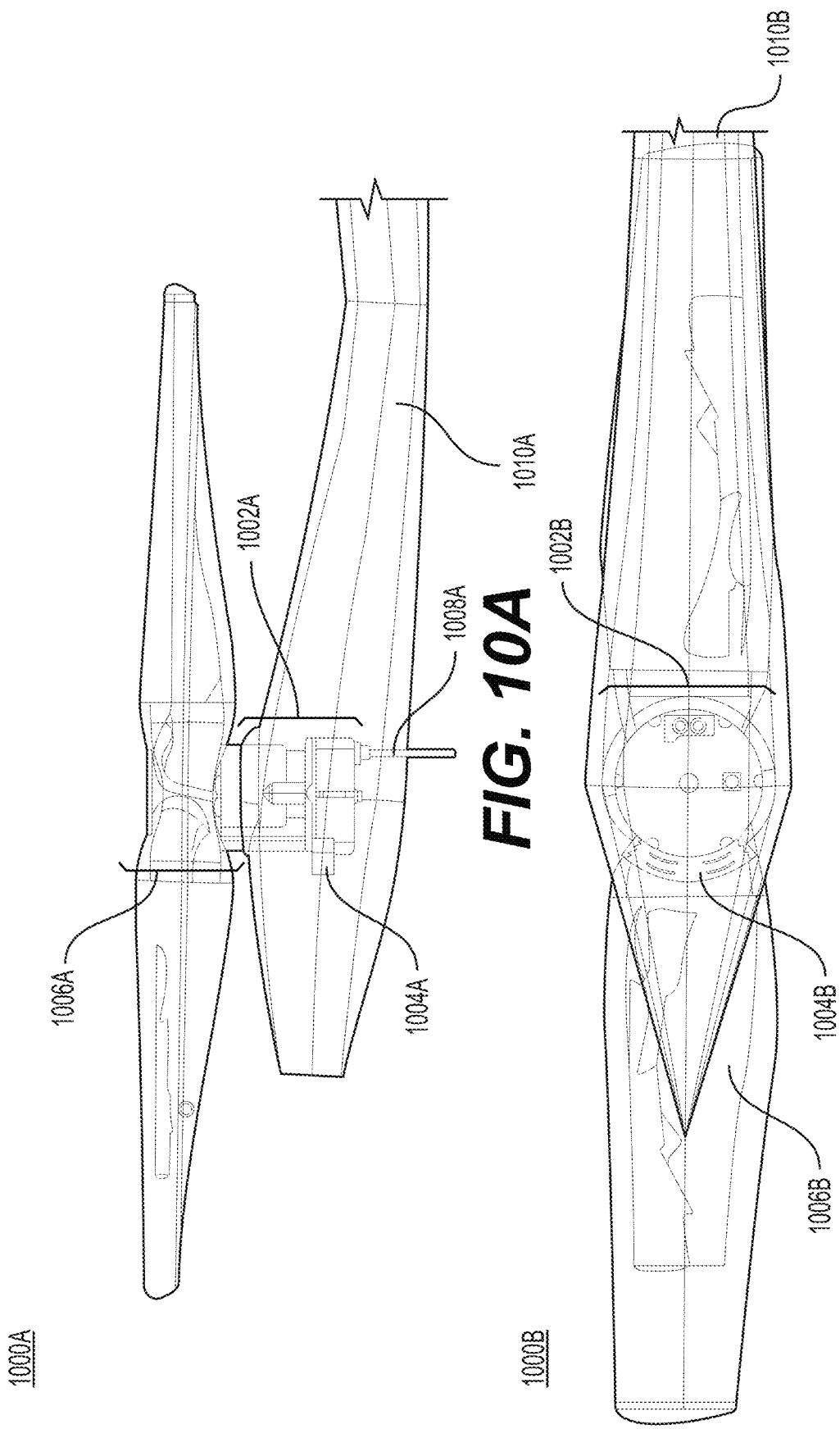
FIGS. 10A-10B are illustrations of an exemplary lift electric propulsion systems of a VTOL aircraft, consistent with some embodiments of the present disclosure.

FIGS. 10A-10B are illustrations of an exemplary lift electric propulsion systems of a VTOL aircraft, consistent with disclosed embodiments. FIGS. 10A and 10B possess like numerals and refer to similar elements of lift electric propulsion systems 1000A and 1000B. As such, similar design considerations and configurations may be considered throughout the embodiments.

FIG. 10A illustrates a side profile of a lift electric propulsion system 1000A in a lift configuration integrated into a boom 101A consistent with the present disclosure. A lift electric propulsion system 1000A may comprise an electric engine assembly 1002A housed within a boom 101A of a VTOL aircraft. In some embodiments, a lift configuration may include the electric engine assembly 1002A being posited vertically within the boom 101A. An electric engine assembly 1002A may comprise an electric motor assembly, a gearbox assembly, an inverter assembly with power connection channels 1008A, and a heat exchanger 1004A, as described herein. The electric engine assembly 1002A may be mechanically coupled to a propulsion assembly 1006A comprising a shaft flange assembly and propeller blades.

FIG. 10B illustrates a top-down view of a lift electric propulsion system 1000B in a lift configuration integrated into a boom 1010B, consistent with the present disclosure.

Some embodiments of the disclosed electric engine may generate heat during operation and may comprise a heat management system to ensure components of the electric engine do not fail during operation. In some embodiments, coolant may be used and circulated throughout individual components of the engine, such as an inverter, gearbox, or motor, through some of the components, or through all of the components of the engine to assist with managing the heat present in the engine. Some embodiments may include using air cooling methods to cool the electric engine or using a mixture of coolant and air to manage the heat generated during operation in the electric engine. In some embodiments, the coolant being used may also be the same liquid that is being used as lubricant throughout the inverter, gearbox, or motor. For example, components of the electric engines may be cooled using a liquid or air or using a mixture of air and liquid cooling. As another example, a motor may be cooled using air cooling while the inverter and gearbox are cooled using liquid cooling. It should be understood that a mixture of cooling may be used for any combination of electric engine components or within each component.

In some embodiments, oil may be used as a lubricant throughout an electric engine and may also be used as coolant fluid to assist in managing the heat generated by the engine during operation. Further to this example, different amounts of oil may be used to act as both lubricant and coolant fluid in the electric engine, such as less than or equal to one quart, 1.5 quarts, two quarts, 2.5 quarts, three quarts, five quarts or any other amount of oil needed to lubricate and cool the electric engine, in combination with or without the assistance of air cooling. In some embodiments, the amount of the oil or liquid to be used in the system in relation to cooling may be determined based on an amount of thermal mass needed to drive heat transfer from the components of the electric propulsion system. As has been disclosed herein, an electric engine may have different primary functionalities such as being used only for lifting and landing, and as such only being used in one orientation, or being used during all stages of flight such as lifting, landing, and in-flight. An engine that is used in all stages of flight may experience various orientations throughout flight and may comprise more lubricant and coolant than the engine only used in one orientation. As such, all the engines on an aircraft may not include the same amount of lubricant and coolant. For example, a lifting and landing engine may only require less than one quart of oil while an engine that operates in all stages of flight may require more than one quart of oil. In some embodiments, the amount of oil or liquid for cooling may be of an appropriate amount to provide sufficient thermal mass to drive heat transfer from the components of the electric propulsion system no matter the orientation of the electric propulsion system. The embodiments discussed herein are exemplary, non-limiting, and do not dictate the bounds of the amount of lubricant and coolant that may be used in an electric engine.

Some embodiments may use oil to lubricate the electric engine and to cool the electric engine. Such embodiments may require additional volumes of oil. In such embodiments, the additional oil may allow for removal of traditional components that may be used to cool such an electric engine. For example, if the electric engine were cooled by another liquid such as glycol, the engine may comprise separate heat exchangers for both the lubricant fluid and the coolant fluid. As such, in embodiments where a single fluid is being used for both lubrication and cooling, such as oil, an increase in oil would be present but there would only be a need for one heat exchanger, so there may be a decrease in mass, due to using less heat exchangers and potentially other components not being required, of the overall system and a more appealing drag profile may be present. Further, using one substance for the lubrication and cooling of the engine may increase efficiency of the system due to the reduction in mass and the benefits of cooling the engine with a substance rather than relying on air cooling which may have issues traveling throughout the engine.

Some embodiments of electric engines may include various components for monitoring flammable fluids, and for preventing ingress of flammable materials into certain sections of the electric engine. Some embodiments may include an electric engine possessing a wet zone enclosure that may be defined by a gearbox, motor, and/or heat exchanger. In some embodiments, an electric engine may possess up to 4 liters, or more, of air within the motor-gearbox housing which is in contact with engine oil. Embodiments of a motor-gearbox housing may equalize internal and external pressure using a breather. Embodiments of a breather may include it protruding above nearby design features to prevent inadvertent entry of external fluids. Some embodiments may include a breather that possesses a screen and a circuitous entry path to prevent entry of external debris. Embodiments may include a sight glass being present on both the tilt and lift electric engines in order to check that oil is not overfilled or underfilled during servicing.

Some embodiments of electric engines may include active protection features in the forward and aft electric engines such as monitoring vibration throughout the engine and internal temperatures such as oil temperature, stator winding set temperature, inverter bulk capacitor temperature, power module temperature, control board power module temperature, control board control processor temperature, control board monitor processor temperature, internal hot-spot temperatures, and other various operating conditions throughout the engine as needed. Such monitoring may be accomplished using various sensors positioned throughout the electric propulsion system and aircraft. Embodiments may include vibration limits based on known failure points or resonances of components and overtemperature limits set based on known failure temperatures and operating limits in relation to auto-ignition temperatures of fluids. In some embodiments, the various sensors used to monitor the operating conditions throughout the engine may report operating conditions to the flight control system. Some embodiments may include a threshold operating value that may be required before an operating value is sent to, or flagged by, the flight control system. In some embodiments, a flight control system may, in response to detecting an operating condition, act to reduce the amount of power directed to an electric propulsion system. Some embodiments may include reducing the amount of power to an electric propulsion system to reduce mechanical wear or friction sparks from vibrations and/or reducing power in an effort to reduce the temperature of components present within the electric propulsion system. Further, some embodiments may include reducing power to an electric propulsion system where a detected efficiency of an inverter is less than a targeted efficiency. In some embodiments, for example where twelve electric propulsion systems are present within the aircraft, a flight control system may act to reduce power, or terminate power, to a single electric propulsion system while increasing the power directed to the remaining electric propulsion systems, or a subset thereof, to counter reduction in lift produced by the one electric propulsion system. In some embodiments, the flight control system may establish various thresholds of operating conditions to correspond with the reduction or increase of power to an electric propulsion system.

Some embodiments may include a High Voltage Power System that may have fuses at the high voltage battery terminals which may rapidly and irreversibly disconnect the engine electrical connection to mitigate and avoid overcurrent events. Such overcurrent protection may be activated when the electric engine current draw is greater than the Overcurrent operating. As such, in some embodiments, failure conditions which lead to overcurrent may only lead to a transient overheating, arc or spark faults. Some embodiments may include a fire threat characterization test ignition source that may be selected to be a more severe ignition source than a short occurring in the electric engine and being opened by the engine fuse. In some embodiments, an inverter may detect AC overcurrent and isolate the erroneous phase and/or will continuously monitor input DC voltage, and will apply protective actions to keep voltages under the overvoltage operating limit.

During takeoff, landing, hover and cruise, motors and related control components of the VTOL aircraft may generate heat. The heat must be dissipated to prevent degradation or damage to the motor, control components and other elements of the VTOL aircraft. For some types of VTOL aircraft, such as electric VTOL (eVTOL) aircraft, thermal control is likewise important to maintain optimal energy efficiency of, e.g., battery-powered components.

Some elements may generate high thermal loads only during certain operational periods. For example, some lift propellers may be used only during takeoff, landing, and hover, and may be shut off during cruise. Therefore, such lift propellers may generate a high thermal load during takeoff, landing, and hover, and generate little or no heat during cruise.

B. Example Inverter Embodiments

Figure 11:
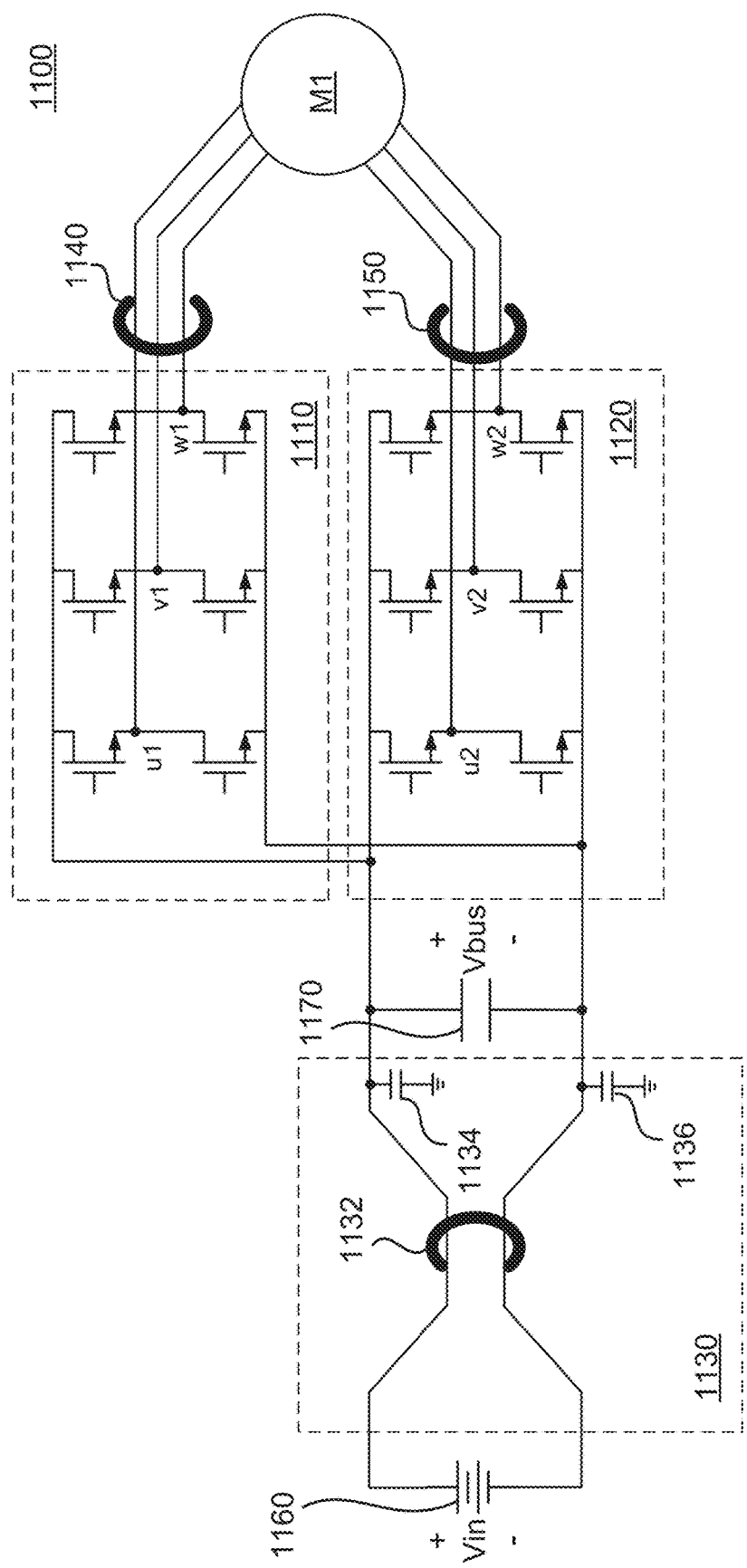
FIG. 11 is a diagram illustrating a portion of an electrical propulsion system for a vertical take-off and landing (VTOL) aircraft, consistent with some embodiments of the present disclosure.

FIG. 11 illustrates a portion of an electrical propulsion system 1100 for a vertical take-off and landing (VTOL) aircraft, consistent with some embodiments of the present disclosure. The electrical propulsion system 1100 may provide a dual three-phase system for motor control. As shown in FIG. 11, the electrical propulsion system 1100 includes a first inverter circuit 1110, a second inverter circuit 1120, an electrical motor M1 configured to drive one or more propellers of the VTOL aircraft, and a bus capacitor 1170 configured to stabilize a direct current (DC) bus voltage Vbus. The first inverter circuit 1110 is coupled to the bus capacitor 1170 and configured to convert the DC bus voltage Vbus on the bus of the first inverter circuit 1110 to alternate current (AC) voltages to drive a first set of stator windings of the electrical motor M1, in response to a first pulse width modulation (PWM) vector. The second inverter circuit 1120 is configured to convert the DC bus voltage Vbus on the bus of the second inverter circuit 1120 to AC voltages to drive a second set of stator windings of the electrical motor M1, in response to a second PWM vector. In some embodiments, the first PWM vector and the second PWM vector are substantially equal and opposite vectors. For example, the delay between PWM signals corresponding to the first PWM vector and the second PWM vector may equal to or less than 0.25%, 0.5%, 1%, or 2% of the switching cycle period. For example, the delay may be within 50 nanoseconds. Accordingly, the first inverter circuit 1110 is configured to output a first set of three-phase AC voltages (e.g., u1, v1, w1) and the second inverter circuit 1120 is configured to output a second set of three-phase AC voltages (e.g., u2, v2, w2), and a phase of the first set of three-phase AC voltages and a corresponding phase of the second set of three-phase AC voltages are two interleaved phases with a phase-shift of substantially 180 degrees (e.g., plus or minus 5 degrees).

In particular, in the electrical propulsion system 1100, two inverter circuits 1110 and 1120 are electrically coupled to the internal high voltage DC supply bus and configured to provide corresponding three-phase AC voltages u1, v1, and w1 and three-phase AC voltages u2, v2, and w2 to drive a dual 3-phase motor M1. The dual-inverter drive system shown in FIG. 11 may improve the motor performance, and improve the system reliability by increasing the number of phases.

As shown in the figure, the inverter circuits 1110 and 1120 are respectively configured to convert the bus voltage Vbus on the high voltage DC supply bus to three-phase AC power to drive the motor M1. When inverter circuits 1110 and 1120 convert the DC power to the AC power, there is a voltage difference between the power source and the neutral point of the load, which is referred to as a common-mode voltage. Common-mode currents due to common-mode voltages in the inverters may be detrimental to the electrical systems. Specifically, the common-mode voltage may result in faults in motors, premature failure of bearings, glitches in the control equipment, etc. In an effort to reduce common mode noises, filter components may be installed in the electrical propulsion system 1100.

For example, the electrical propulsion system 1100 may include a DC common-mode filter 1130 and AC common-mode chokes 1140 and 1150. The DC common-mode filter 1130 may be coupled to the bus capacitor 1170 and configured to reduce common mode signals at a DC-side of the first inverter circuit 1110 and the second inverter circuit 1120. The one or more AC common-mode chokes 1140 and 1150 may be coupled to an AC-side of the first inverter circuit 1110 or the second inverter circuit 1120 to reduce common mode signals.

For example, the DC common-mode filter 1130 may be located between the DC power source 1160 and the bus capacitor 1170 and formed by a set of DC-side chokes 1132 and a set of DC common-mode filter capacitors 1134, 1136.

The DC-side chokes 1132 may be configured such that positive and negative lines are wound around the same magnetic core. Thus, the DC-side chokes 1132 and the DC common-mode filter capacitors 1134, 1136 may be configured to reduce the common mode signals at the DC-side. However, a larger filter may add volume and mass and may incur additional losses.

In some embodiments, the electrical propulsion system 1100 may achieve a common mode voltage cancelation by applying proper space vector modulations (SVM) to the inverter circuits 1110 and 1120.

The winding arrangement of the motor M1 applied in the electrical propulsion system 1100 may be different in various embodiments. For example, the phase difference in electrical angle between the two sets of 3-phase windings may be designed to reduce the harmonic components. In some embodiments, the first set of stator windings and the second set of stator winding of the motor M1 are shifted by substantially 180 degrees (e.g., plus or minus 5 degrees). That is, the motor phasing between independent winding sets may be 180 degrees, or there abouts, out of phase.

In some embodiments, the first inverter circuit 1110 is controlled using a standard center aligned space vector modulation (SVM) while the second inverter circuit 1120 is controlled using an inverted center aligned space vector modulation. In such operation mode, the common mode voltage can be canceled through the equal and opposite PWM vectors.

Figure 12A:
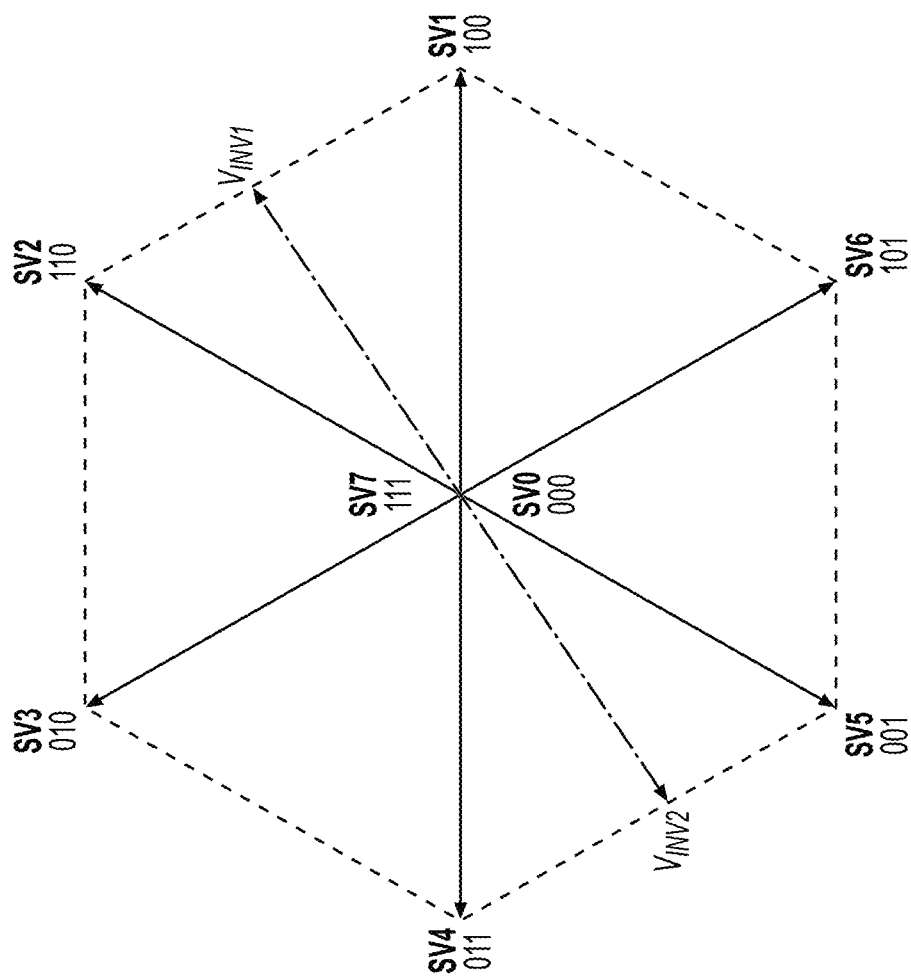
FIG. 12A is a diagram illustrating PWM vectors for controlling the inverter circuits in the electrical propulsion system of FIG. 11, consistent with some embodiments of the present disclosure.
Figure 12B:
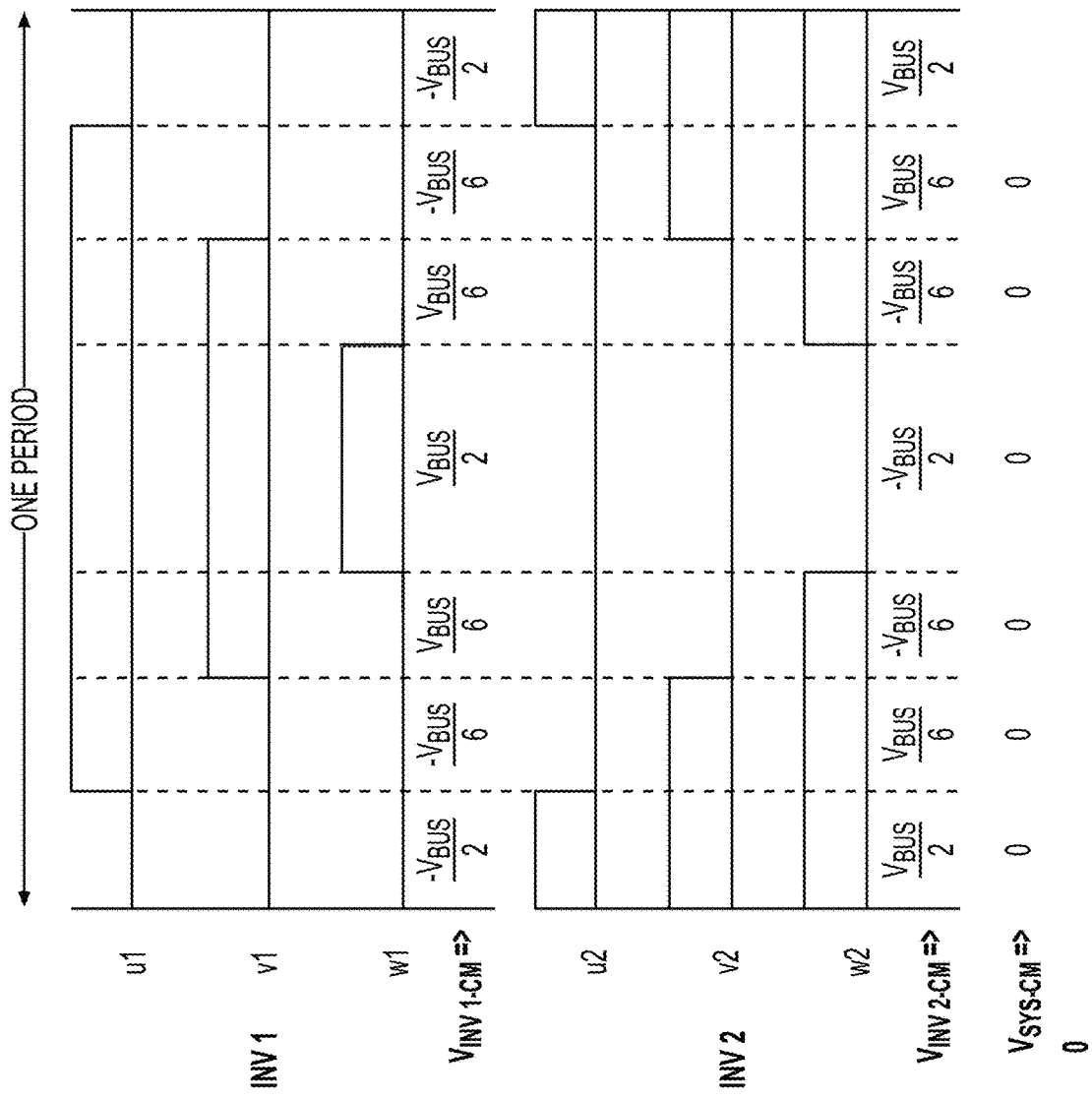
FIG. 12B is a diagram illustrating the three-phase voltages outputted by the inverter circuits in one period, consistent with some embodiments of the present disclosure.

FIG. 12A is a diagram illustrating PWM vectors for controlling the first inverter circuit 1110 and the second inverter circuit 1120 in the electrical propulsion system 1100 of FIG. 11, consistent with some embodiments of the present disclosure. FIG. 12B is a diagram illustrating the three-phase voltages u1, v1, and w1 outputted by the first inverter circuit 1110 and the three-phase voltages u2, v2, and w2 outputted by the second inverter circuit 1120 in one period, consistent with some embodiments of the present disclosure.

In some embodiments, a space vector modulation (SVM) algorithm is applied to control the pulse-width modulation (PWM) and used for generating the AC voltages from the DC voltage to drive the three-phase motor at varying speeds. As one would understand, different SVM algorithms may have different quality and computational requirements. As shown in FIG. 12A, there are eight possible switching vectors SV0-SV7 for a three-leg inverter using space vector modulation. An example PWM vector $V_{INV}1$ for the first inverter circuit 1110 and an example PWM vector $V_{INV}2$ for the second inverter circuit 1120 are shown in FIG. 12A.

During the operation, the switches within the inverter circuits 1110 and 1120 are controlled so that the both switches (i.e., the upper switch and the lower switch) in the same leg are not turned on at the same time to avoid the DC supply being shorted. This can be achieved by the complementary operation of the switches within the same leg. That is, for each output leg, when the upper switch is on, then the lower switch is off, and vice versa. Accordingly, the switching vectors SV0-SV7 include six active switching vectors SV1-SV6 and two zero vectors, SV0 and SV7.

As shown in FIG. 12A, the switching vector SV0={000} represents that the upper switches of three phases U, V, and W are OFF, while the lower switches of three phases U, V, and W are ON. The switching vector SV1={100} represents that the upper switch of the U phase is ON and the upper switches of the V phase and the W phase are OFF. The switching vector SV2={110} represents that the upper switches of the U phase and the V phase are ON and the upper switch of the W phase is OFF. The switching vector SV3={010} represents that the upper switch of the V phase is ON and the upper switches of the U phase and the W phase are OFF. The switching vector SV4={011} represents that the upper switches of the V phase and the W phase are ON and the upper switch of the U phase is OFF. The switching vector SV5={001} represents that the upper switch of the W phase is ON and the upper switches of the U phase and the V phase are OFF. The switching vector SV6={101} represents that the upper switches of the U phase and the W phase are ON and the upper switch of the V phase is OFF. The switching vector SV7={111} represents that the upper switches of three phases U, V, and W are ON, while the lower switches of three phases U, V, and W are OFF.

In some embodiments, the first inverter circuit 1110 is controlled according to a standard center aligned SVM starting from the switching vector SV0 with the upper switches of three phases U, V, and W being OFF, and the second inverter circuit 1120 is controlled according to the inverted center-aligned SVM starting from the switching vector SV7 with the upper switches of three phases U, V, and W being ON. Accordingly, as shown in FIG. 12B, in each stage of the operation period, the three-phase voltages u1, v1, w1 outputted by the first inverter circuit 1110 are respectively complementary to the three-phase voltages u2, v2, w2 outputted by the second inverter circuit 1120. The resulted PWM vector $V_{INV}1$ for the first inverter circuit 1110 and PWM vector $V_{INV}2$ for the second inverter circuit 1120 are thus equal and opposite PWM vectors. Accordingly, the common mode voltage $V_{INV1-CM}$ resulted from the first inverter circuit 1110 and the common mode voltage $V_{INV2-CM}$ resulted from the second inverter circuit 1120 have the same value but opposite signs, and the total common mode voltage VSYS-CM is zero due to the cancelation of the common mode voltage.

In some embodiments, a six-phase machine may thus be implemented to achieve similar functionality of the three-phase machine but with a reduction in the common mode noises experienced by the system. In some embodiments, the common mode voltage cancellation across any number of phases may be implemented, such that the combination of the PWM vectors can cancel or reduce the common mode noises experienced by the system. In some embodiments, the first and the second inverter circuits 1110 and 1120 may be configured to pull the power from the power source (e.g., from the DC bus capacitor 1170) at the same time, and the first and the second inverter circuits 1110 and 1120 operate according to PWM signals with equal duty cycle but substantially 180 degrees out of phase.

By the common mode voltage cancellation achieved by the electrical propulsion system 1100 having two inverters, the volume and the mass of the required electromagnetic compatibility (EMC) components in the system may be reduced. In some embodiments, the common mode voltage cancellation may provide at least 30-40 dB lower noise levels at low frequencies, which have a substantial impact on the filter size. For example, the required size of the magnetic core for the DC-side choke can be significantly reduced, which reduces the total weight of the engine.

Figure 13A:
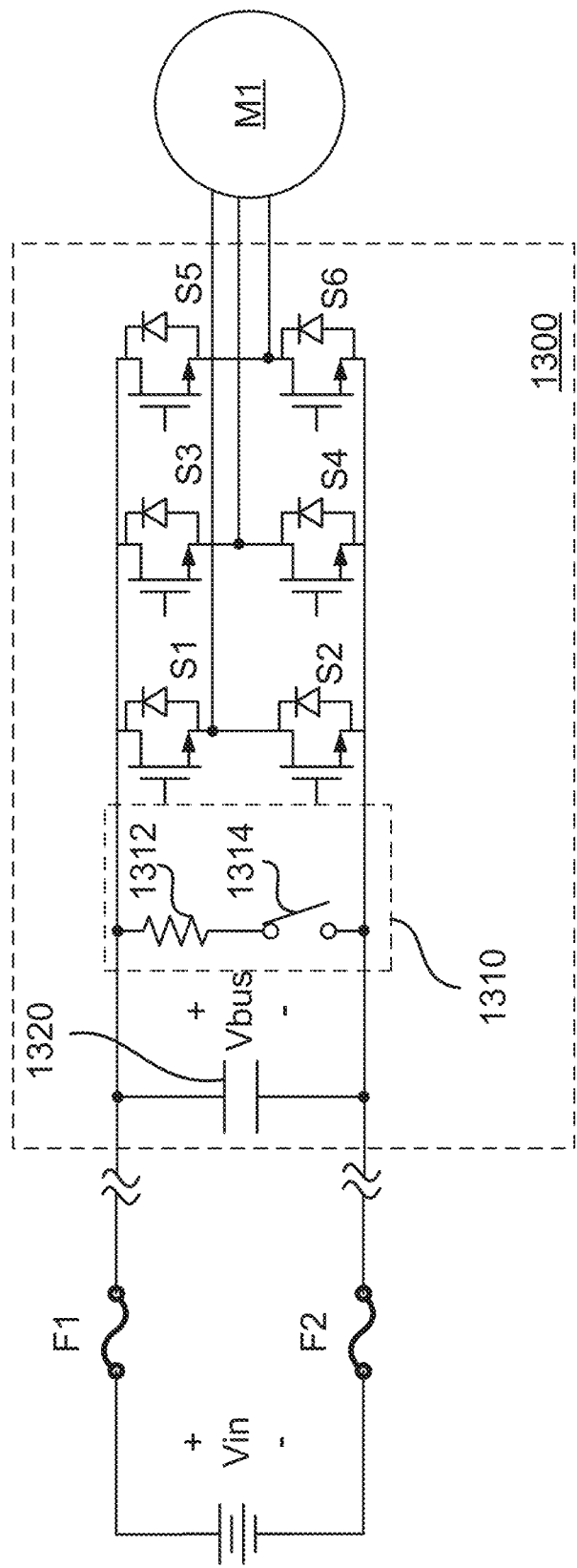
FIG. 13A is a diagram illustrating an inverter circuit for motor control in the electric propulsion system, consistent with some embodiments of the present disclosure.

Reference is made to FIG. 13A, which illustrates an inverter circuit 1300 for motor control in the electric propulsion system, consistent with some embodiments of the present disclosure. The inverter circuit 1300, which is a voltage source inverter (VSI), may use FETs S1-S6 as switches. The FETs S1-S6 can be selectively turned on or off in response to control signals from a controller according to the SVM algorithm described above to generate the three-phase AC output voltages to drive the motor M1.

As shown in the embodiments of FIG. 13A, the inverter circuit 1300 includes a bus capacitor 1320 configured to stabilize the direct current (DC) bus voltage Vbus, and switches (e.g., FETs S1-S6) forming a plurality of phase legs. Any of the phase legs includes an upper switch (e.g., FETs S1, S3, or S5) arranged between a positive terminal of the bus capacitor 1320 and an AC output terminal of the phase leg and a lower switch (e.g., FETs S2, S4, or S6) arranged between a negative terminal of the bus capacitor 1320 and the AC output terminal of the phase leg.

In the inverter circuit 1300, the FETs S1-S6 may be operated independently. During the operation, when a malfunction occurs to any of the FETs S1-S6, a single-phase short-circuit fault may occur where one leg is shorted, causing uncontrolled current through the corresponding phase as the machine rotates. This type of failure could lead to a fire hazard, create drag on the system, apply very high torque pulsations to the system, or any other potential hazard. As such, it would be advantageous to reduce the torque present in response to the single-phase short-circuit fault in the system operation.

The inverter circuit 1300 includes a first discharging circuit 1310 across the two terminals of the bus capacitor 1320. That is, the first discharging circuit 1310 is coupled to the bus capacitor 1320 in parallel. In some embodiments, the first discharging circuit 1310 includes a discharging resistor 1312 and a switch 1314 connected to the discharging resistor 1312 in series to provide the discharging path for discharging the energy stored in the bus capacitor 1320 (i.e., the bulk capacitor) when the switch 1314 is closed in response to a corresponding command signal from a controller. Thus, when the single-phase short occurs, the inverter circuit 1300 may discharge the bus capacitor 1320 by closing the switch 1314 to remove the energy stored in the bus capacitor 1320 at the proper timing.

In some embodiments, the FETs S1-S6 can be further controlled to short the bus capacitor 1320 in response to the DC bus voltage Vbus being lower than a threshold value in a fault condition. Alternatively stated, during the discharging of the bus capacitor 1320, a bridge short-through of all FETs S1-S6 can be applied to short the HV bus when the bus voltage Vbus is lower than the desired safety threshold value to guarantee a safe discharge process and spread the heat generated during the single-phase fault across all FETs S1-S6 in the inverter circuit 1300 to ensure safety and reduce the damages when the fault occurs.

In addition, as shown in FIG. 13A, pyro fuses F1 and F2 are coupled between the inverter circuit 1300 and the DC voltage source Vin (e.g., a battery pack). For example, pyro fuses F1 and F2 may be a type of fuse configured to be activated by an external source when the circuit disconnection and isolation is required. For example, the first pyro fuse F1 may be coupled between a positive terminal of the DC voltage source Vin and a positive terminal of the bus capacitor 1320. The second pyro fuse F2 may be coupled between a negative terminal of the DC voltage source Vin and a negative terminal of the bus capacitor 1320.

Figure 13B:
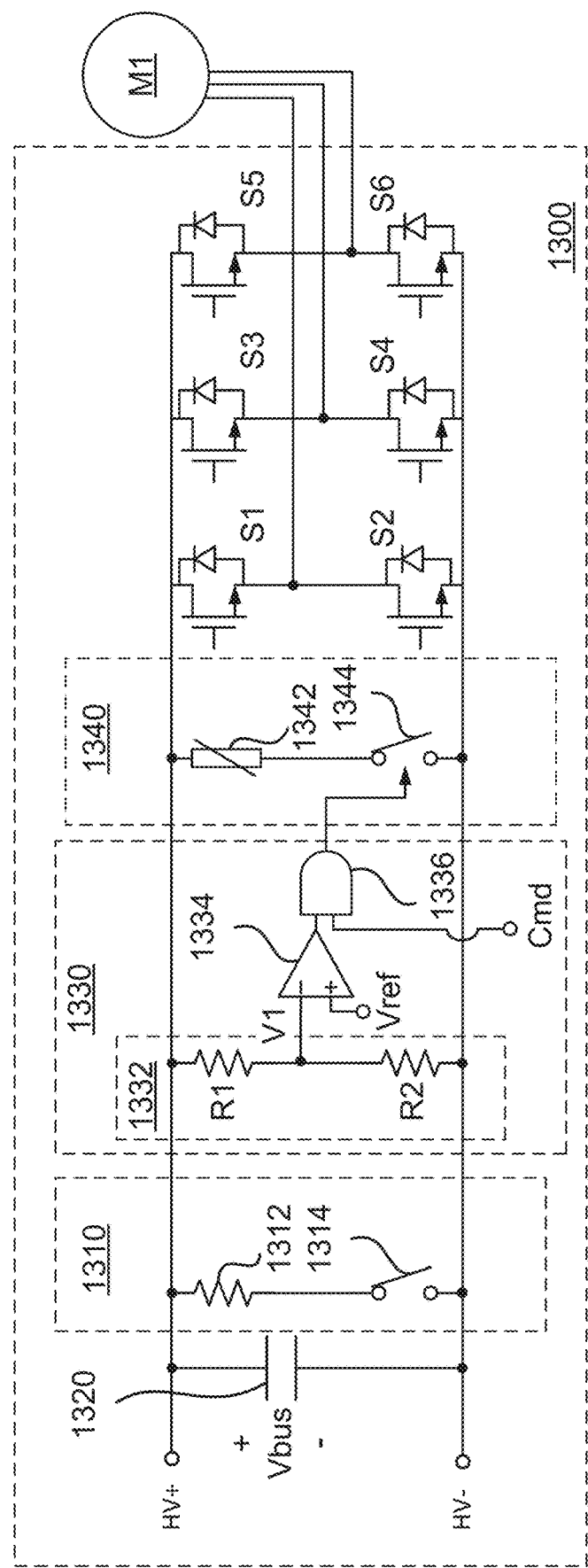
FIG. 13B is a diagram illustrating another inverter circuit for motor control in the electric propulsion system, consistent with some embodiments of the present disclosure.

Reference is made to FIG. 13B, which illustrates another inverter circuit 1300 for motor control in the electric propulsion system, consistent with some embodiments of the present disclosure. The inverter circuit 1300 of FIG. 13B is also a voltage source inverter (VSI) using FETs S1-S6 as the switches to output the three-phase AC output voltages to drive the motor M1.

Compared to the inverter circuit 1300 of FIG. 13A, the inverter circuit 1300 of FIG. 13B further includes a comparator circuit 1330 and a second discharging circuit 1340 forming another discharging path across the bus capacitor 1320.

In particular, in the embodiments of FIG. 13B, when the inverter circuit 1300 discharges the bus capacitor 1320, the comparator circuit 1330 is configured to monitor the bus voltage Vbus across the bus capacitor 1320. In some other embodiments, the comparator circuit 1330 may also be configured to monitor the voltage across any other component(s) within the inverter circuit 1300, to determine whether to discharge the energy through the second discharging circuit 1340 according to the voltage measurement. The second discharging circuit 1340 is configured to provide a rapid discharge path for the remaining energy stored in the bus capacitor 1320. In some embodiments, the threshold value can be designed to confirm that the power source (e.g., the battery) has been disconnected from the HV DC bus.

For example, the comparator circuit 1330 may include a resistor voltage divider 1332, a comparator 1334, and a logic circuit 1336. The resistor voltage divider 1332 includes resistors R1 and R2 connected in series to provide a voltage V1. The comparator 1334 is configured to compare the voltage V1 outputted from the resistor voltage divider 1332 and a reference voltage Vref. The second discharging circuit 1340 may include a rapid discharge component 1342 and a switch 1344 connected in series.

As the bus capacitor 1320 is discharged through the first discharging circuit 1310, the bus voltage Vbus gradually decreases, and the voltage V1, which is a fixed fraction of the bus voltage Vbus, also decreases. When the voltage V1 is lower than the reference voltage Vref, it is determined that the bus voltage Vbus is lower than the preset threshold value, indicating that the power source and the HV DC bus are disconnected. In response to the voltage V1 being lower than the reference voltage Vref, the comparator 1334 is configured to output a corresponding signal (e.g., a logic one signal). The logic circuit 1336 may be an AND gate configured to receive the signal outputted by the comparator 1334 and a command signal Cmd from a control circuit. When the command signal Cmd and the signal outputted by the comparator 1334 are both logic one, the logic circuit 1336 may output a corresponding control signal to turn on the switch 1344 in the second discharging circuit 1340. Accordingly, the bus capacitor 1320 can be discharged through the second discharging circuit 1340 to achieve rapid discharge.

For example, the rapid discharge component 1342 may be a transient voltage suppressor diode (TVS), a metal oxide varistor (MOV), a low-resistance value device, or any combination thereof, but the present disclosure is not limited thereto. The rapid discharge component 1342 may be any other component that is capable of achieving rapid discharge to remove the remaining energy on the HV DC bus.

Alternatively stated, according to the circuit operation described above, the inverter circuit 1300 may achieve rapid high voltage discharge by monitoring a voltage across a component (e.g., the bus capacitor) in the inverter circuit 1300 and executing a short-through across FETs S1-S6 in the inverter circuit 1300. In some embodiments, after a first discharging stage is initiated to begin a voltage discharge, the voltage across the bus capacitor is monitored using the comparator circuit until a threshold value is reached. In response to a detection of the monitored voltage dropping to the threshold value, a second discharging stage may be engaged in parallel. The second discharging stage may utilize a discharging component (e.g., rapid discharge component 1342), such as a TVS or MOV, to discharge the remaining voltage accordingly. In some other embodiments, the threshold voltage detection above may not be the only condition for initiating the second discharging stage. For example, a corresponding command (e.g., command signal Cmd) for initiating the second discharging stage may be generated and sent to one or more components (e.g., logic circuit 1336) to initiate the second discharging stage, along with the detection of the monitored voltage dropping to the threshold value. In various embodiments, the specific threshold voltage may be dependent on battery characteristics, resistor characteristics, the length of discharge time, or any other components involved in the circuitry.

FIG. 14 illustrates an example flowchart of a method 1400 for controlling the inverter circuit 1300 of FIG. 13A or FIG. 13B, to mitigate the single-phase short-circuit fault, consistent with some embodiments of the present disclosure. As shown in FIG. 14, the method 1400 may include steps 1410, 1420, 1430, 1440, and 1450.

In step 1410, whether a fault occurs on one of a plurality of switches (e.g., FETs S1-S6) in the inverter circuit 1300 is detected. In some embodiments, the inverter circuit 1300 is configured to confirm whether a single-phase short-circuit fault occurs on any one of the FETs S1-S6. For example, the inverter circuit 1300 may include voltage or current sensing circuits or components to detect the single-phase short-circuit fault based on voltage or current signals within the inverter circuit 1300.

In step 1420, a three-phase short is applied by controlling low-side switches (e.g., FETs S2, S4, and S6 in FIG. 13B) or high-side switches (e.g., FETs S1, S3, and S5 in FIG. 13B), in response to the detection of the single-phase short-circuit fault. In some embodiments, in response to the confirmation that the single-phase short-circuit fault occurs, in step 1420, the inverter circuit 1300 is configured to apply the three-phase short on the normal side of the inverter circuit 1300. For example, when a low-side FET (e.g., S2, S4, or S6) is damaged causing a single-phase short, the high-side FETs (e.g., S1, S3, and S5) can be controlled to apply the three-phase short, and vice versa.

After the three-phase short is applied, in step 1430, the inverter circuit 1300 is disconnected from the power source, in response to the detection of the single-phase short-circuit fault. In some embodiments, the inverter circuit 1300 is configured to instruct a battery management system (BMS) in the system to enable the protection mechanism to open the HV circuit from the failed inverter circuit 1300. In some embodiments, the battery management system is housed within an HV Junction Box (HVJB) and is configured to monitor voltages, temperatures, currents, and isolation resistances and control pack contactors and pyro fuses to protect against fault conditions for safe operation.

In some embodiments, the step 1430 includes steps 1432, 1434, and 1436. For example, in step 1432, an instruction can be sent from the inverter circuit 1300 to the BMS. Then, in step 1434, the BMS may send one or more command signals to one or more pyro fuse drivers to activate one or more pyro fuses to disconnect the inverter circuit 1300 from the power source.

Alternatively stated, in response to the instruction or command from the inverter circuit 1300, the BMS is configured to generate a pyro event to activate one or both of the pyro fuses F1 and F2 to disconnect the HV DC voltage source Vin from the failed inverter circuit 1300. In addition, in step 1436, the BMS may further send a confirmation signal to the inverter circuit 1300 after the one or more pyro fuses are activated, confirming that a pyro has been fired.

That is, the BMS is used to activate the pyro fuses F1 and/or F2 when a short event occurs. In some embodiments, the BMS may also send command signals to the corresponding pyro fuse driver to activate the pyro fuse, so when other types of failures occur as to protect against overcurrent and electrically isolate the battery pack from the connected inverter circuit 1300. Then, the inverter circuit 1300 may confirm that the HV DC voltage source Vin (e.g., the battery pack) is disconnected from the inverter circuit 1300, in response to receiving the confirmation signal from the BMS.

In step 1440, the bus voltage Vbus across the bus capacitor 1320 of the inverter circuit 1300 is discharged after the inverter circuit 1300 is disconnected from the power source. In some embodiments, after receiving the confirmation signal, the inverter circuit 1300 is configured to remove the stored energy in the bus capacitor 1320. For example, the inverter circuit 1300 may close the switch 1314, forming the discharging path to discharge the energy using the discharging resistor 1312. Accordingly, the bus voltage Vbus across the bus capacitor 1320 reduces gradually in the discharging process. In some embodiments, in step 1440, the inverter circuit 1300 may perform rapid discharge by using multiple discharging circuits in parallel.

For example, in step 1442, a first switch (e.g., switch 1314 in FIG. 13B) in the first discharging circuit (e.g., first discharging circuit 1310 in FIG. 13B) is closed to provide a first discharging path, in response to a confirmation that the inverter circuit 1300 is disconnected from the power source. In step 1444, the bus voltage Vbus across the bus capacitor 1320 is monitored by a comparator circuit (e.g., comparator circuit 1330 in FIG. 13B). In step 1446, a second switch (e.g., switch 1344 in FIG. 13B) in a second discharging circuit (e.g., second discharging circuit 1340 in FIG. 13B) is closed to provide a second discharging path in parallel to the first discharging path, in response to the bus voltage Vbus being lower than a second threshold value.

In step 1450, the plurality of switches (e.g., FET S1-S6 in FIG. 13B) in the inverter circuit 1300 is closed to short the bus capacitor 1320, in response to the bus voltage Vbus being lower than a first threshold value. In some embodiments, the inverter circuit 1300 is configured to detect the bus voltage Vbus across the bus capacitor 1320, and when the bus voltage Vbus is below a specific threshold voltage (e.g., about 50 V), the inverter circuit 1300 may apply a bridge short-through to short all six FETs S1-S6 to short the high voltage bus. The threshold voltage may be designed based on practical needs. For example, the range for the threshold voltage may be about 40V-60V. Because the short-through configuration is enabled after the bus voltage Vbus is dropped under a certain level during the rapid discharge process, the resulting current would be within the safe current limit and would not damage components (e.g., the FETs S1-S6) in the inverter circuit 1300. After the high voltage bus is shorted, the motor M1 is brought to a stop accordingly.

By the operations of the method 1400 above, the heat generated during the single-phase fault may be spread across all FETs in the inverter circuit 1300 to ensure safety and reduce the damages when the fault occurs. Further, any one or more steps 1410-1450 performed in the method 1400 may take place with certain time frames in between steps, such as nano second, millisecond, or any other value of time. In some embodiments, a control circuit in the system may provide the control signals to selectively open or close the switches (e.g., FETs) in the inverter circuit 1300. The control circuit may also provide the pyro signal to activate one or both of the pyro fuses F1 and F2. In some other embodiments, the system may also include multiple control circuits to send pyro signal(s) for activating the pyro fuses F1 and F2 and control signal(s) for controlling one or more of the FETs in the inverter circuit 1300. It should be understood that any step(s) discussed herein are not necessarily performed in a specific number of stages or in a certain stage. The step(s) may be performed throughout the method 1400 as desired. In addition, the above illustrations include exemplary steps and/or operations, but the operations may be added, replaced, changed order, and/or eliminated as appropriate, without departing from the spirit and scope of the present disclosure. It will be appreciated that the methods for controlling the inverter circuits and the inverter circuits disclosed in various embodiments may also be utilized in various fields or systems, including but not limited to the fields of automotive, hybrid and electric vehicles, electric motors, etc.

The various embodiments herein are described in the general context of method steps or processes, which may be implemented in one aspect by an integrated circuit including circuitry for performing the methods for controlling the inverter circuit. The circuitry may be configured to perform steps or processes of the above methods. For examples, the circuitry may include one or more controllers, one or more processors, or a combination thereof, to control the inverter circuits disclosed in various embodiments of the present disclosure.

The various embodiments herein are described in the general context of method steps or processes, which may be implemented in one aspect by a computer program product, embodied in a transitory or a non-transitory computer-readable medium, which stores computer-executable instructions, such as program code, executed by one or more processors or one or more controllers in the system. A computer-readable medium may include removable and nonremovable storage devices including, but not limited to, Read Only Memory device (ROM), Random Access Memory device (RAM), compact discs (CDs), digital versatile discs (DVD), etc.

Generally, program modules may include routines, programs, objects, components, data structures, etc., that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Figure 15:
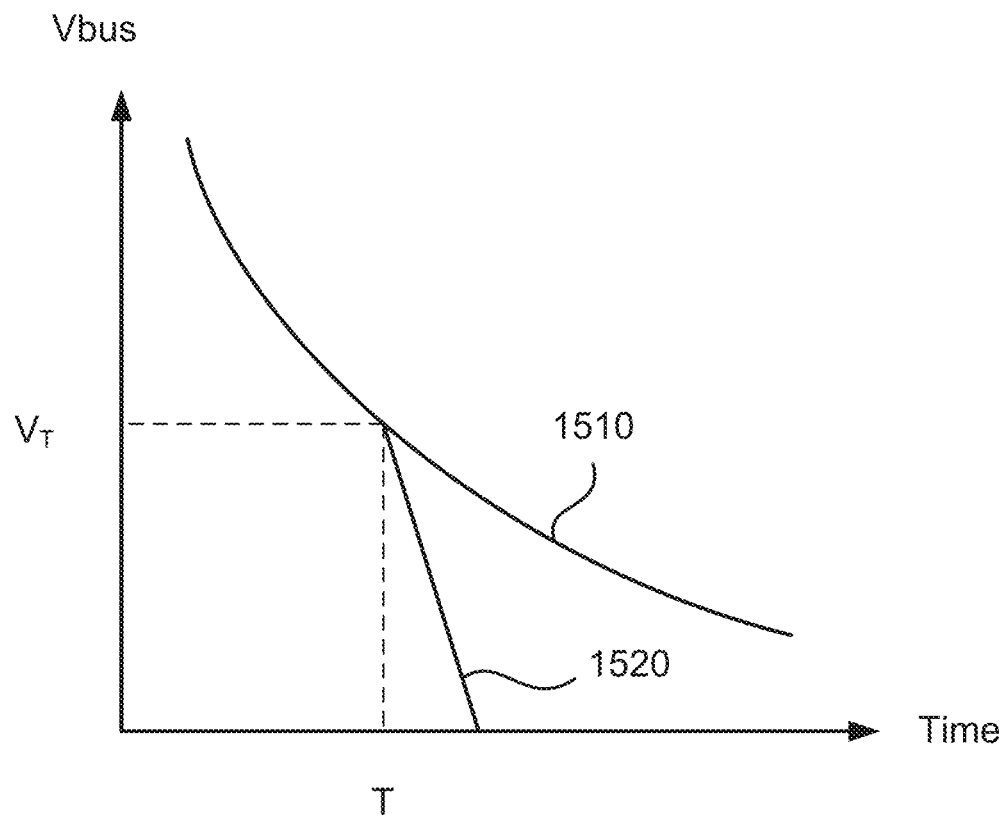
FIG. 15 is a graph showing the bus voltage against time for the HV DC bus during a discharging period, consistent with some embodiments of the present disclosure.

Reference is made to FIG. 15, which is a graph showing the bus voltage against time for the HV DC bus during a discharging period, consistent with some embodiments of the present disclosure. As shown in curve 1510, in a conventional discharge process, the voltage, current, and charge may decay exponentially during the capacitor discharge. On the other hand, as shown in curve 1520, in some embodiments of the present disclosure, the rapid discharge can be enabled. Accordingly, at the beginning, the bus voltage Vbus may decay exponentially along an exponential decay curve, but once the bus voltage Vbus drops to a certain threshold value $V_T$ at the time T, the bus voltage Vbus may rapidly drop to zero, rather than continuing along the exponential decay curve. As explained in the embodiments above, after the inverter circuit 1300 detects the bus voltage Vbus being lower than the certain threshold value $V_T$ at time T, various pieces of circuitry (e.g., the rapid discharge component 1342 in FIG. 13B) may be used to quickly discharge the remaining voltage.

Reference is made to FIGS. 16A-16D, which are graphs showing the EMI noises, consistent with some embodiments of the present disclosure. FIGS. 16A-16B are graphs respectively showing the EMI noises detected on a positive side and a negative side of a dual-inverter system, consistent with some embodiments of the present disclosure. FIGS. 16C-16D are graphs respectively showing the EMI noises detected on a positive side and a negative side of a single inverter system, consistent with some embodiments of the present disclosure. As shown in FIGS. 16A-16D, the EMI noises in the single inverter system are about 30-40 dB higher than the EMI noises in the proposed system using two inverters with PWM signals interleaved by substantially 180 degrees in various embodiments disclosed in the present disclosure. Accordingly, by the common mode noise suppression/cancellation achieved by the electrical propulsion system having two inverters, the volume and the mass of the required electromagnetic compatibility (EMC) components may be reduced. As a result, a light-weight engine design can be achieved.

In the foregoing specification, embodiments have been described with reference to numerous specific details that can vary from implementation to implementation. Certain adaptations and modifications of the described embodiments can be made. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a module may include A or B, then, unless specifically stated otherwise or infeasible, the module may include A, or B, or A and B. As a second example, if it is stated that a module may include A, B, or C, then, unless specifically stated otherwise or infeasible, the module may include A, or B, or C, or A and B, or A and C, or B and C, or A and B and C.

In the drawings and specification, there have been disclosed exemplary embodiments. It will be apparent to those skilled in the art that various modifications and variations can be made to the disclosed apparatuses, systems, and related methods. Other embodiments will be apparent to those skilled in the art from consideration of the specification and practice of the disclosed apparatuses, systems, and related methods. It is intended that the specification and examples be considered as exemplary only, with a true scope being indicated by the following claims and their equivalents.

The embodiments may further be described using the following clauses:

1. A propulsion system for an aircraft, comprising:
an electrical motor configured to drive one or more propellers of the aircraft; and a capacitor configured to stabilize a direct current (DC) bus voltage;
a first inverter circuit coupled to the capacitor and configured to convert the DC bus voltage on a first bus of the first inverter circuit to alternate current (AC) voltages to drive a first set of stator windings of the electrical motor, based on a first pulse width modulation (PWM) vector; and
a second inverter circuit coupled to the capacitor and configured to convert the DC bus voltage on a second bus of the second inverter circuit to AC voltages to drive a second set of stator windings of the electrical motor, based on a second PWM vector, wherein the first PWM vector and the second PWM vector are substantially equal and opposite vectors.

2. The propulsion system of clause 1, wherein the first set of stator windings and the second set of stator winding are shifted by substantially 180 degrees.

3. The propulsion system of clause 1, wherein the first inverter circuit is controlled using a center aligned space vector modulation.

4. The propulsion system of clause 3, wherein the second inverter circuit is controlled using an inverted center aligned space vector modulation.

5. The propulsion system of clause 1, wherein the first inverter circuit is configured to output a first set of three-phase AC voltages and the second inverter circuit is configured to output a second set of three-phase AC voltages.

6. The propulsion system of clause 5, wherein a phase of the first set of three-phase AC voltages and a corresponding phase of the second set of three-phase AC voltages are two interleaved phases with a phase-shift of substantially 180 degrees.

7. The propulsion system of clause 1, further comprising:
a DC common-mode filter coupled to the capacitor and configured to reduce common mode signals at a DC-side of the first inverter circuit and the second inverter circuit.

8. The propulsion system of clause 1, further comprising:
one or more AC common-mode chokes coupled to an AC-side of the first inverter circuit or the second inverter circuit to reduce common mode signals.

9. A method for controlling a propulsion system for an aircraft, comprising:
stabilizing, by a capacitor, a direct current (DC) bus voltage;
converting, by a first inverter circuit coupled to the capacitor, the DC bus voltage to alternate current (AC) voltages to drive a first set of stator windings of an electrical motor according to a first pulse width modulation (PWM) vector;
converting, by a second inverter circuit coupled to the capacitor, the DC bus voltage to AC voltages to drive a second set of stator windings of the electrical motor, in response to a second PWM vector, wherein the first PWM vector and the second PWM vector are substantially equal and opposite vectors; and driving one or more propellers of the aircraft by the electrical motor.

10. The method of clause 9, wherein the first set of stator windings and the second set of stator winding are shifted by substantially 180 degrees.

11. The method of clause 9, further comprising:
controlling the first inverter circuit using a center aligned space vector modulation.

12. The method of clause 11, further comprising:
controlling the second inverter circuit using an inverted center aligned space vector modulation.

13. The method of clause 9, further comprising:
output a first set of three-phase AC voltages by the first inverter circuit to drive the first set of stator windings; and output a second set of three-phase AC voltages by the second inverter circuit to drive the second set of stator windings.

14. The method of clause 13, wherein a phase of the first set of three-phase AC voltages and a corresponding phase of the second set of three-phase AC voltages are two interleaved phases with a phase-shift of substantially 180 degrees.

15. The method of clause 9, further comprising:
reducing, by a DC common-mode filter coupled to the capacitor, common mode signals at a DC-side of the first inverter circuit and the second inverter circuit.

16. The method of clause 9, further comprising:
reducing, by one or more AC common-mode chokes coupled to an AC-side of the first inverter circuit or the second inverter circuit, common mode signals at the AC-side of the first inverter circuit and the second inverter circuit.

17. An integrated circuit, comprising circuitry for performing a method for controlling a propulsion system for an aircraft, the circuitry is configured to:
control a first inverter circuit coupled to a capacitor, to convert a DC bus voltage to alternate current (AC) voltages to drive a first set of stator windings of an electrical motor according to a first pulse width modulation (PWM) vector; and
control a second inverter circuit coupled to the capacitor, to convert the DC bus voltage to AC voltages to drive a second set of stator windings of the electrical motor, in response to a second PWM vector, wherein the first PWM vector and the second PWM vector are substantially equal and opposite vectors to drive one or more propellers of the aircraft by the electrical motor.

18. The integrated circuit of clause 17, wherein the first set of stator windings and the second set of stator winding are shifted by substantially 180 degrees.

19. The integrated circuit of clause 17, wherein the circuitry is further configured to control the first inverter circuit using a center aligned space vector modulation.

20. The integrated circuit of clause 19, wherein the circuitry is further configured to control the second inverter circuit using an inverted center aligned space vector modulation.

21. The integrated circuit of clause 17, wherein the circuitry is further configured to:
control the first inverter circuit to output a first set of three-phase AC voltages by the first inverter circuit to drive the first set of stator windings; and
control the second inverter circuit to output a second set of three-phase AC voltages by the second inverter circuit to drive the second set of stator windings.

22. The integrated circuit of clause 21, wherein a phase of the first set of three-phase AC voltages and a corresponding phase of the second set of three-phase AC voltages are two interleaved phases with a phase-shift of substantially 180 degrees.

23. The integrated circuit of clause 17, wherein a DC common-mode filter is coupled to the capacitor and configured to reduce common mode signals at a DC-side of the first inverter circuit and the second inverter circuit.

24. The integrated circuit of clause 17, wherein one or more AC common-mode chokes are coupled to an AC-side of the first inverter circuit or the second inverter circuit to reduce common mode signals.

25. An inverter circuit for a propulsion system for an aircraft, comprising:
a capacitor configured to stabilize a direct current (DC) bus voltage;
a plurality of switches forming a plurality of phase legs, wherein any of the phase legs comprises an upper switch arranged between a positive terminal of the capacitor and an AC output terminal of the phase leg and a lower switch arranged between a negative terminal of the capacitor and the AC output terminal of the phase leg; and
a first discharging circuit coupled to the capacitor in parallel and configured to provide a first discharging path for discharging energy stored in the capacitor, wherein the plurality of switches are controlled to short the capacitor in response to the DC bus voltage being lower than a first threshold value in a fault condition.

26. The inverter circuit of clause 25, wherein the first discharging circuit comprises a discharging resistor and a first switch connected to the discharging resistor in series, and in response to a single-phase short, the inverter circuit is configured to discharge the capacitor by closing the first switch.

27. The inverter circuit of clause 25, further comprising:
a second discharging circuit coupled to the capacitor in parallel and configured to provide a second discharging path for discharging energy stored in the capacitor.

28. The inverter circuit of clause 27, wherein the second discharging circuit comprises a discharge component and a second switch connected in series.

29. The inverter circuit of clause 28, wherein the discharge component comprises a transient voltage suppressor diode (TVS), a metal oxide varistor (MOV), a low-resistance value device, or any combination thereof.

30. The inverter circuit of clause 28, further comprising:
a comparator circuit configured to monitor the DC bus voltage across the capacitor to determine whether to discharge the energy stored in the capacitor through the second discharging circuit.

31. The inverter circuit of clause 30, wherein the comparator circuit comprises:
a resistor voltage divider comprising resistors connected in series to provide a first voltage, wherein the first voltage is a fixed fraction of the DC bus voltage; and
a comparator coupled to the resistor voltage divider and configured to compare the first voltage outputted from the resistor voltage divider and a reference voltage, and output an output signal in response to the first voltage being lower than the reference voltage.

32. The inverter circuit of clause 31, wherein the comparator circuit further comprises: a logic circuit coupled to the comparator and configured to receive the output signal from the comparator and a command signal from a control circuit, and output a control signal according to the output signal and the command signal to selectively turn on the second switch of the second discharging circuit.

33. A method for controlling an inverter circuit, comprising:
detecting whether a fault occurs on one of a plurality of switches in the inverter circuit; disconnecting the inverter circuit from a power source, in response to a detection of a single-phase short-circuit fault;
providing, by a first discharging circuit, a first discharging path to discharge a DC bus voltage across a capacitor of the inverter circuit after the inverter circuit is disconnected from the power source; and
controlling the plurality of switches in the inverter circuit to short the capacitor, in response to the DC bus voltage being lower than a first threshold value.

34. The method of clause 33, wherein the first discharging circuit comprises a discharging resistor and a first switch connected to the discharging resistor in series, and in response to a single-phase short, the inverter circuit is configured to discharge the capacitor by closing the first switch.

35. The method of clause 33, further comprising:
providing, by a second discharging circuit coupled to the capacitor in parallel, a second discharging path to discharge the DC bus voltage.

36. The method of clause 35, wherein the second discharging circuit comprises a discharge component and a second switch connected in series.

37. The method of clause 36, wherein the discharge component comprises a transient voltage suppressor diode (TVS), a metal oxide varistor (MOV), a low-resistance value device, or any combination thereof.

38. The method of clause 36, further comprising:
monitoring the DC bus voltage across the capacitor by a comparator circuit to determine whether to discharge the energy stored in the capacitor through the second discharging circuit.

39. The method of clause 38, further comprising:
providing a first voltage by a resistor voltage divider comprising resistors connected in series, wherein the first voltage is a fixed fraction of the bus voltage; and
comparing the first voltage and a reference voltage by a comparator to output an output signal in response to the first voltage being lower than the reference voltage.

40. The method of clause 39, further comprising:
receiving, by a logic circuit, the output signal from the comparator and a command signal from a control circuit; and
outputting, by the logic circuit, a control signal according to the output signal and the command signal to selectively turn on the second switch in the second discharging circuit.

41. An integrated circuit, comprising circuitry for performing a method for controlling an inverter circuit, the circuitry is configured to perform:
detecting whether a fault occurs on one of a plurality of switches in the inverter circuit;
disconnecting the inverter circuit from a power source, in response to a detection of a single-phase short-circuit fault;
controlling the inverter circuit to provide, by a first discharging circuit, a first discharging path to discharge a DC bus voltage across a capacitor of the inverter circuit after the inverter circuit is disconnected from the power source; and
controlling the inverter circuit to control the plurality of switches in the inverter circuit to short the capacitor, in response to the DC bus voltage being lower than a first threshold value.

42. The integrated circuit of clause 41, wherein the first discharging circuit comprises a discharging resistor and a first switch connected to the discharging resistor in series, and in response to a single-phase short, the circuitry is configured to control the inverter circuit to discharge the capacitor by closing the first switch.

43. The integrated circuit of clause 41, wherein the circuitry is configured to perform:
controlling the inverter circuit to provide, by a second discharging circuit coupled to the capacitor in parallel, a second discharging path to discharge the DC bus voltage.

44. The integrated circuit of clause 43, wherein the second discharging circuit comprises a discharge component and a second switch connected in series.

45. The integrated circuit of clause 44, wherein the discharge component comprises a transient voltage suppressor diode (TVS), a metal oxide varistor (MOV), a low-resistance value device, or any combination thereof.

46. The integrated circuit of clause 44, wherein the DC bus voltage across the capacitor is monitored by a comparator circuit to determine whether to discharge the energy stored in the capacitor through the second discharging circuit.

47. The integrated circuit of clause 46, wherein the DC bus voltage across the capacitor is monitored by:
providing a first voltage by a resistor voltage divider comprising resistors connected in series, wherein the first voltage is a fixed fraction of the bus voltage; and
comparing the first voltage and a reference voltage by a comparator to output an output signal in response to the first voltage being lower than the reference voltage.

48. The integrated circuit of clause 47, wherein the DC bus voltage across the capacitor is monitored by:
receiving, by a logic circuit, the output signal from the comparator and a command signal from a control circuit; and
outputting, by the logic circuit, a control signal according to the output signal and the command signal to selectively turn on the second switch in the second discharging circuit.

49. An inverter circuit for a propulsion system for an aircraft, comprising:
a capacitor configured to stabilize a direct current (DC) bus voltage;
a plurality of switches forming a plurality of phase legs, wherein any of the phase legs comprises an upper switch arranged between a positive terminal of the capacitor and an AC output terminal of the phase leg and a lower switch arranged between a negative terminal of the capacitor and the AC output terminal of the phase leg;
a first discharging circuit coupled to the capacitor in parallel and configured to provide a first discharging path for discharging energy stored in the capacitor; and
a second discharging circuit coupled to the capacitor in parallel and configured to provide a second discharging path for discharging energy stored in the capacitor, in response to the DC bus voltage being lower than a threshold value in a fault condition.

50. The inverter circuit of clause 49, wherein the first discharging circuit comprises a discharging resistor and a first switch connected to the discharging resistor in series, and in response to a single-phase short, the inverter circuit is configured to discharge the capacitor by closing the first switch.

51. The inverter circuit of clause 49, wherein the second discharging circuit comprises a discharge component and a second switch connected in series.

52. The inverter circuit of clause 51, wherein the discharge component comprises a transient voltage suppressor diode (TVS), a metal oxide varistor (MOV), a low-resistance value device, or any combination thereof.

53. The inverter circuit of clause 51, further comprising:
a comparator circuit configured to monitor the DC bus voltage across the capacitor to determine whether to discharge the energy stored in the capacitor through the second discharging circuit.

54. The inverter circuit of clause 53, wherein the comparator circuit comprises:
a resistor voltage divider comprising resistors connected in series to provide a first voltage, wherein the first voltage is a fixed fraction of the DC bus voltage; and
a comparator coupled to the resistor voltage divider and configured to compare the first voltage outputted from the resistor voltage divider and a reference voltage, and output an output signal in response to the first voltage being lower than the reference voltage.

55. The inverter circuit of clause 54, wherein the comparator circuit further comprises:
a logic circuit coupled to the comparator and configured to receive the output signal from the comparator and a command signal from a control circuit, and output a control signal according to the output signal and the command signal to selectively turn on the second switch of the second discharging circuit.

56. A method for controlling an inverter circuit, comprising:
detecting whether a fault occurs on one of a plurality of switches in the inverter circuit;
disconnecting the inverter circuit from a power source, in response to a detection of a single-phase short-circuit fault; and
discharging a bus voltage across a capacitor of the inverter circuit after the inverter circuit is disconnected from the power source by:
using a first discharging circuit to provide a first discharging path, in response to a confirmation that the inverter circuit is disconnected from the power source; and
using a second discharging circuit to provide a second discharging path in parallel to the first discharging path, in response to the bus voltage being lower than a threshold value.

57. The method of clause 56, wherein the first discharging circuit comprises a discharging resistor and a first switch connected to the discharging resistor in series, and the discharging the bus voltage across the capacitor further comprises:
closing the first switch in the first discharging circuit to provide the first discharging path, in response to the confirmation that the inverter circuit is disconnected from the power source.

58. The method of clause 56, wherein the second discharging circuit comprises a discharge component and a second switch connected in series, and the discharging the bus voltage across the capacitor further comprises:
closing the second switch in the second discharging circuit to provide the second discharging path in parallel to the first discharging path, in response to the bus voltage being lower than the threshold value.

59. The method of clause 58, wherein the discharge component comprises a transient voltage suppressor diode (TVS), a metal oxide varistor (MOV), a low-resistance value device, or any combination thereof.

60. The method of clause 58, wherein the discharging the bus voltage across the capacitor further comprises:
monitoring the bus voltage across the capacitor by a comparator circuit to determine whether to discharge the energy stored in the capacitor through the second discharging circuit.

61. The method of clause 60, wherein the discharging the bus voltage across the capacitor further comprises:
providing a first voltage by a resistor voltage divider comprising resistors connected in series, wherein the first voltage is a fixed fraction of the bus voltage; and
comparing the first voltage and a reference voltage by a comparator to output an output signal in response to the first voltage being lower than the reference voltage.

62. The method of clause 61, wherein the discharging the bus voltage across the capacitor further comprises:
receiving, by a logic circuit, the output signal from the comparator and a command signal from a control circuit; and
outputting, by the logic circuit, a control signal according to the output signal and the command signal to selectively turn on the second switch in the second discharging circuit.

63. An integrated circuit, comprising circuitry for performing a method for controlling an inverter circuit, the circuitry is configured to:
detect whether a fault occurs on one of a plurality of switches in the inverter circuit;
disconnect the inverter circuit from a power source, in response to a detection of a single-phase short-circuit fault; and
control the inverter circuit to discharge a bus voltage across a capacitor of the inverter circuit after the inverter circuit is disconnected from the power source by:
using a first discharging circuit to provide a first discharging path, in response to a confirmation that the inverter circuit is disconnected from the power source; and
using a second discharging circuit to provide a second discharging path in parallel to the first discharging path, in response to the bus voltage being lower than a threshold value.

64. The integrated circuit of clause 63, wherein the first discharging circuit comprises a discharging resistor and a first switch connected to the discharging resistor in series, and the inverter circuit is controlled to discharge the bus voltage across the capacitor by:
closing the first switch in the first discharging circuit to provide the first discharging path in response to the confirmation that the inverter circuit is disconnected from the power source.

65. The integrated circuit of clause 63, wherein the second discharging circuit comprises a discharge component and a second switch connected in series, and the inverter circuit is controlled to discharge the bus voltage across the capacitor by:
closing the second switch in the second discharging circuit to provide the second discharging path, in response to the bus voltage being lower than the threshold value.

66. The method of clause 65, wherein the discharge component comprises a transient voltage suppressor diode (TVS), a metal oxide varistor (MOV), a low-resistance value device, or any combination thereof.

67. The integrated circuit of clause 65, wherein the bus voltage across the capacitor is discharged by:
monitoring the bus voltage across the capacitor by a comparator circuit to determine whether to discharge the energy stored in the capacitor through the second discharging circuit.

68. The integrated circuit of clause 67, wherein the bus voltage across the capacitor is discharged by:
providing a first voltage by a resistor voltage divider comprising resistors connected in series, wherein the first voltage is a fixed fraction of the bus voltage; and
comparing the first voltage and a reference voltage by a comparator to output an output signal in response to the first voltage being lower than the reference voltage.

69. The integrated circuit of clause 68, wherein the bus voltage across the capacitor is discharged by:
receiving, by a logic circuit, the output signal from the comparator and a command signal from a control circuit; and
outputting, by the logic circuit, a control signal according to the output signal and the command signal to selectively turn on the second switch in the second discharging circuit. The embodiments disclosed herein are intended to be non-limiting. Those of ordinary skill in the art will appreciate that certain components and configurations of components may be modified without departing from the scope of the disclosed embodiments.

The invention claimed is:

1. A method for controlling an inverter circuit, comprising:
detecting whether a fault occurs on one of a plurality of switches in the inverter circuit;
disconnecting the inverter circuit from a power source, in response to a detection of a single-phase short-circuit fault;
providing, by a first discharging circuit, a first discharging path to discharge a DC bus voltage across a capacitor of the inverter circuit after the inverter circuit is disconnected from the power source; and
controlling the plurality of switches in the inverter circuit to short the capacitor, in response to the DC bus voltage being lower than a first threshold value.

2. The method of claim 1, wherein the first discharging circuit comprises a discharging resistor and a first switch connected to the discharging resistor in series, and in response to a single-phase short, the inverter circuit is configured to discharge the capacitor by closing the first switch.

3. The method of claim 1, further comprising:
providing, by a second discharging circuit coupled to the capacitor in parallel, a second discharging path to discharge the DC bus voltage.

4. The method of claim 3, wherein the second discharging circuit comprises a discharge component and a second switch connected in series.

5. The method of claim 4, wherein the discharge component comprises a transient voltage suppressor diode (TVS), a metal oxide varistor (MOV), a low-resistance value device, or any combination thereof.

6. The method of claim 4, further comprising:
monitoring the DC bus voltage across the capacitor by a comparator circuit to determine whether to discharge energy stored in the capacitor through the second discharging circuit.

7. The method of claim 6, further comprising:
providing a first voltage by a resistor voltage divider comprising resistors connected in series, wherein the first voltage is a fixed fraction of the bus voltage; and
comparing the first voltage and a reference voltage by a comparator to output an output signal in response to the first voltage being lower than the reference voltage.

8. The method of claim 7, further comprising:
receiving, by a logic circuit, the output signal from the comparator and a command signal from a control circuit; and
outputting, by the logic circuit, a control signal according to the output signal and the command signal to selectively turn on the second switch in the second discharging circuit.

9. An integrated circuit, comprising circuitry for performing a method for controlling an inverter circuit, the circuitry is configured to perform:
detecting whether a fault occurs on one of a plurality of switches in the inverter circuit;
disconnecting the inverter circuit from a power source, in response to a detection of a single-phase short-circuit fault;
controlling the inverter circuit to provide, by a first discharging circuit, a first discharging path to discharge a DC bus voltage across a capacitor of the inverter circuit after the inverter circuit is disconnected from the power source; and
controlling the inverter circuit to control the plurality of switches in the inverter circuit to short the capacitor, in response to the DC bus voltage being lower than a first threshold value.

10. The integrated circuit of claim 9, wherein the first discharging circuit comprises a discharging resistor and a first switch connected to the discharging resistor in series, and in response to a single-phase short, the circuitry is configured to control the inverter circuit to discharge the capacitor by closing the first switch.

11. The integrated circuit of claim 9, wherein the circuitry is configured to perform:
controlling the inverter circuit to provide, by a second discharging circuit couple to the capacitor in parallel, a second discharging path to discharge the DC bus voltage.

12. The integrated circuit of claim 11, wherein the second discharging circuit comprises a discharge component and a second switch connected in series.

13. The integrated circuit of claim 12, wherein the discharge component comprises a transient voltage suppressor diode (TVS), a metal oxide varistor (MOV), a low-resistance value device, or any combination thereof.

14. The integrated circuit of claim 12, wherein the DC bus voltage across the capacitor is monitored by a comparator circuit to determine whether to discharge energy stored in the capacitor through the second discharging circuit.

15. The integrated circuit of claim 14, wherein the DC bus voltage across the capacitor is monitored by:
providing a first voltage by a resistor voltage divider comprising resistors connected in series, wherein the first voltage is a fixed fraction of the bus voltage; and
comparing the first voltage and a reference voltage by a comparator to output an output signal in response to the first voltage being lower than the reference voltage.

16. The integrated circuit of claim 15, wherein the DC bus voltage across the capacitor is monitored by:
receiving, by a logic circuit, the output signal from the comparator and a command signal from a control circuit; and
outputting, by the logic circuit, a control signal according to the output signal and the command signal to selectively turn on the second switch in the second discharging circuit.

17. An inverter circuit for a propulsion system for an aircraft, comprising:
a capacitor configured to stabilize a direct current (DC) bus voltage;
a plurality of switches forming a plurality of phase legs, wherein any of the phase legs comprises an upper switch arranged between a positive terminal of the capacitor and an AC output terminal of the phase leg and a lower switch arranged between a negative terminal of the capacitor and the AC output terminal of the phase leg;
a first discharging circuit coupled to the capacitor in parallel and configured to provide a first discharging path for discharging energy stored in the capacitor; and
a second discharging circuit coupled to the capacitor in parallel and configured to provide a second discharging path for discharging energy stored in the capacitor, in response to the DC bus voltage being lower than a threshold value in a fault condition.

18. The inverter circuit of claim 17, wherein the first discharging circuit comprises a discharging resistor and a first switch connected to the discharging resistor in series, and in response to a single-phase short, the inverter circuit is configured to discharge the capacitor by closing the first switch.

19. The inverter circuit of claim 17, wherein the second discharging circuit comprises a discharge component and a second switch connected in series.

20. The inverter circuit of claim 19, wherein the discharge component comprises a transient voltage suppressor diode (TVS), a metal oxide varistor (MOV), a low-resistance value device, or any combination thereof.

21. The inverter circuit of claim 19, further comprising:
a comparator circuit configured to monitor the DC bus voltage across the capacitor to determine whether to discharge the energy stored in the capacitor through the second discharging circuit.

22. The inverter circuit of claim 21, wherein the comparator circuit comprises:
a resistor voltage divider comprising resistors connected in series to provide a first voltage, wherein the first voltage is a fixed fraction of the DC bus voltage; and
a comparator coupled to the resistor voltage divider and configured to compare the first voltage outputted from the resistor voltage divider and a reference voltage, and output an output signal in response to the first voltage being lower than the reference voltage.

23. The inverter circuit of claim 22, wherein the comparator circuit further comprises:
a logic circuit coupled to the comparator and configured to receive the output signal from the comparator and a command signal from a control circuit, and output a control signal according to the output signal and the command signal to selectively turn on the second switch of the second discharging circuit.

* * * * *